US012041137B2

(12) United States Patent
Luo et al.

(10) Patent No.: US 12,041,137 B2
(45) Date of Patent: Jul. 16, 2024

(54) GROUP USER MIGRATION METHOD, APPARATUS AND DEVICE, AND STORAGE MEDIUM

(71) Applicant: TENCENT TECHNOLOGY (SHENZHEN) COMPANY LIMITED, Shenzhen (CN)

(72) Inventors: Yijun Luo, Shenzhen (CN); Yang Chen, Shenzhen (CN); Qing Wang, Shenzhen (CN); Runhao Zheng, Shenzhen (CN); Li Lin, Shenzhen (CN); Tieming Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/948,875

(22) Filed: Sep. 20, 2022

(65) Prior Publication Data
US 2023/0016256 A1 Jan. 19, 2023

Related U.S. Application Data

(63) Continuation of application No. PCT/CN2021/123953, filed on Oct. 15, 2021.

(30) Foreign Application Priority Data

Nov. 13, 2020 (CN) .......................... 202011273232.6

(51) Int. Cl.
*H04L 67/148* (2022.01)
*G06K 19/06* (2006.01)
*H04L 51/04* (2022.01)

(52) U.S. Cl.
CPC ...... *H04L 67/148* (2013.01); *G06K 19/06009* (2013.01); *H04L 51/04* (2013.01)

(58) Field of Classification Search
CPC ..................................................... H04L 67/148
See application file for complete search history.

(56) References Cited

U.S. PATENT DOCUMENTS

| 2014/0026079 | A1* | 1/2014 | Graham | H04L 12/1813 |
| | | | | 715/758 |
| 2015/0304369 | A1* | 10/2015 | Sandholm | H04W 4/08 |
| | | | | 715/753 |

(Continued)

FOREIGN PATENT DOCUMENTS

| CN | 104270336 A | 1/2015 |
| CN | 110336683 A | 10/2019 |
| CN | 110365501 A | 10/2019 |

OTHER PUBLICATIONS

The World Intellectual Property Organization (WIPO) International Search Report for PCT/CN2021/123953 Jan. 12, 2022 6 Pages (including translation).

*Primary Examiner* — Ryan J Jakovac
(74) *Attorney, Agent, or Firm* — ANOVA LAW GROUP, PLLC

(57) ABSTRACT

A group user migration method includes: creating a target graphic code and a corresponding first group in a first application in response to a group user migration request, the group user migration request being used for requesting to migrate a user in any group in a second application to a group in the first application; sharing the target graphic code to a target group in the second application in response to a sharing request for the target graphic code; determining a group to which the user belongs in the second application in response to a request of any user in the second application for joining the first group; and joining the user to the first group of the first application in response to determining that the user belongs to the target group.

12 Claims, 19 Drawing Sheets

(56) References Cited

U.S. PATENT DOCUMENTS

2018/0367495 A1* 12/2018 Kim .................... H04L 12/185
2019/0305940 A1   10/2019 Bhabbur et al.

* cited by examiner

GROUP USER MIGRATION METHOD, APPARATUS AND DEVICE, AND STORAGE MEDIUM

RELATED APPLICATION(S)

This application is a continuation application of PCT Patent Application No. PCT/CN2021/123953 filed on Oct. 15, 2021, which claims priority to Chinese Patent Application No. 202011273232.6, entitled "GROUP USER MIGRATION METHOD, APPARATUS AND DEVICE, AND STORAGE MEDIUM" and filed with the China National Intellectual Property Administration on Nov. 13, 2020, all of which are incorporated herein by reference in entirety.

FIELD OF THE TECHNOLOGY

The present disclosure relates to the field of computer technologies, and in particular relates to a group user migration method, apparatus and device, and a storage medium.

BACKGROUND

Via the Internet technology, the development of enterprises increasingly relies on the progress of the Internet technology. In this context, the way business personnel of enterprises communicate with customers is also changing.

Business personnel may use instant messaging software to pull multiple customers into a group, to facilitate the maintenance and management of customers. However, enterprises may replace another instant messaging software to maintain customers. In this scenario, business personnel notifies the customers in the original instant messaging software one by one to join the group in the replaced instant messaging software, resulting in lower efficiency of group user migration.

SUMMARY

The embodiments of the present disclosure provide a group user migration method, apparatus and device, and a storage medium, and technical solutions are as follows:

In one aspect, the present disclosure provides a group user migration method applied to a first application server, the first application server is configured to provide background services for a first application, and the method includes: creating a target graphic code and a first group in the first application in response to a group user migration request, the group user migration request being used for requesting to migrate a user in any group in a second application to a group in the first application; sharing the target graphic code to a target group in the second application in response to a sharing request for the target graphic code; determining a group to which the user belongs in the second application in response to a request of any user in the second application for joining the first group; and joining the user to the first group of the first application when or in response to determining that the user belongs to the target group.

In another aspect, the present disclosure provides a group user migration method applied to a terminal, a first application and a second application being installed on the terminal, and the method includes: receiving a group user migration instruction, the group user migration instruction being used for instructing to migrate a user in any group in the second application to a group in the first application; displaying a target graphic code in response to the group user migration instruction, the target graphic code corresponding to a first group created in the first application; and sharing the target graphic code to a target group in the second application in response to a sharing instruction for the target graphic code, to join users in the target group to the first group of the first application based on the target graphic code.

In yet another aspect, the present disclosure provides a group user migration apparatus applied to a first application server, the first application server being configured to provide background services for a first application, and the apparatus including: a memory storing computer program instructions; and a processor coupled to the memory and configured to execute the computer program instructions and perform: creating a target graphic code and a first group in the first application in response to a group user migration request, the group user migration request being used for requesting to migrate a user in any group in a second application to a group in the first application; sharing the target graphic code to a target group in the second application in response to a sharing request for the target graphic code; determining a group to which the user belongs in the second application in response to a request of any user in the second application for joining the first group; and joining the user to the first group of the first application in response to determining that the user belongs to the target group.

In yet another aspect, the present disclosure provides a group user migration apparatus applied to a terminal, a first application and a second application being installed on the terminal the apparatus including: a memory storing computer program instructions; and a processor coupled to the memory and configured to execute the computer program instructions and perform: receiving a group user migration instruction, the group user migration instruction being used for instructing to migrate a user in any group in the second application to a group in the first application; displaying a target graphic code in response to the group user migration instruction, the target graphic code corresponding to a first group created in the first application; and sharing the target graphic code to a target group in the second application in response to a sharing instruction for the target graphic code, to join users in the target group to the first group of the first application based on the target graphic code.

According to one aspect, a computing device is provided, including one or more processors and one or more memories, the one or more memories storing at least one computer-readable instruction, the computer-readable instruction being loaded and executed by the one or more processors to implement the group user migration method.

According to one aspect, one or more computer-readable storage media are provided, storing at least one computer-readable instruction, the computer-readable instruction being loaded and executed by a processor to implement the group user migration method.

According to one aspect, a computer program product is provided, including program code, the program code being stored in a computer-readable storage medium, a processor of a computing device reading the program code from the computer-readable storage medium, and the processor executing the program code, to cause the computing device to implement the group user migration method.

Details of one or more embodiments of the present disclosure are provided in the accompany drawings and descriptions below. Other features, objectives, and advantages of the present disclosure are illustrated in the present disclosure, the accompanying drawings, and the claims.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

The terms "first", "second", and the like in the present disclosure are used for distinguishing between same items or similar items of which effects and functions are the same. It should be understood that, the "first", "second", and "nth" do not have a dependency relationship in logic or time sequence, and a quantity and an execution order thereof are not limited.

In the present disclosure, "at least one" means one or more, and "a plurality of" means two or more. For example, "a plurality of reference face images" means two or more reference face images.

Figure 1:
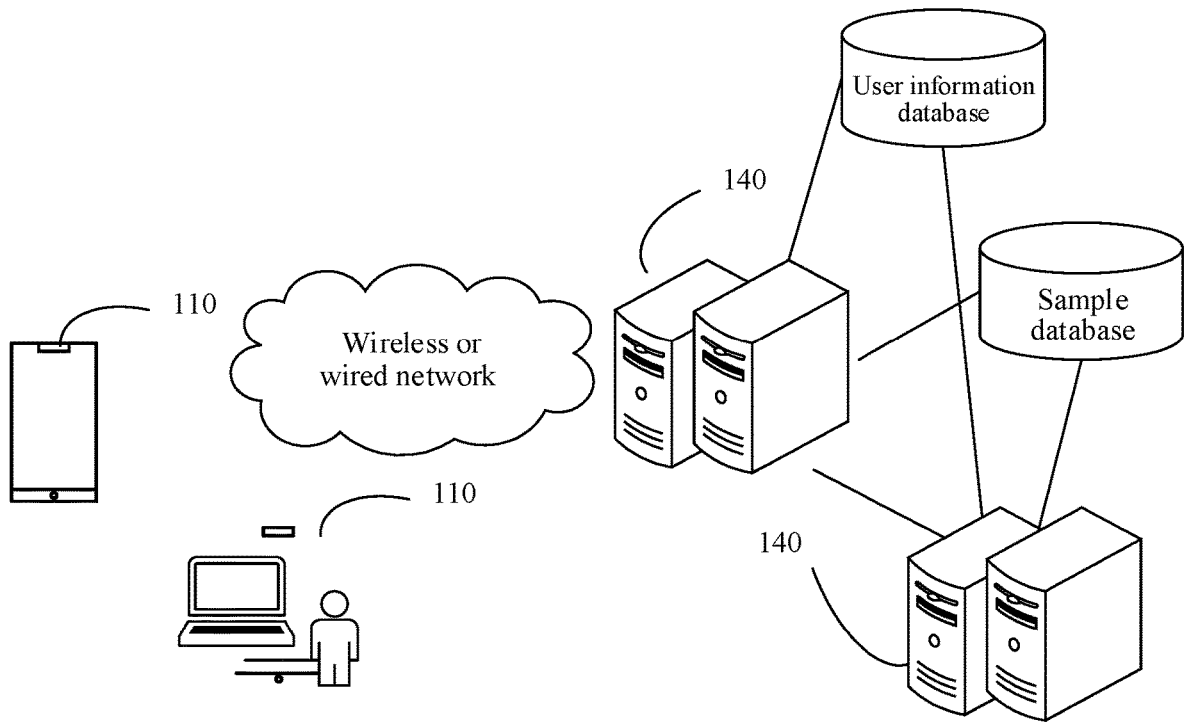
FIG. 1 is a schematic diagram of an implementation environment of a group user migration method according to certain embodiment(s) of the present disclosure.

FIG. 1 is a schematic diagram of an implementation environment of a group user migration method provided by an embodiment of the present disclosure. Referring to FIG. 1, the implementation environment may include a terminal 110 and a first application server 140.

The terminal 110 is connected to the first application server 140 by a wireless network or a wired network. In an embodiment, the terminal 110 may be a smartphone, a tablet computer, a notebook computer, a desktop computer, a smartwatch, or the like, but is not limited thereto. An application program that supports group user migration is installed and run on the terminal 110.

In an embodiment, the first application server 140 is an independent physical server, or is a server cluster or a distributed system formed by a plurality of physical servers, or is a cloud server that provides cloud computing services such as a cloud service, a cloud database, cloud computing, a cloud function, cloud storage, a network service, cloud communication, a middleware service, a domain name service, a security service, a content delivery network (CDN), big data, and an AI platform.

In an embodiment, the terminal 110 generally refers to one of multiple terminals, and only the terminal 110 is used as an example in the embodiment of the present disclosure.

A person skilled in the art may learn that there may be more or fewer terminals. For example, there may be only one terminal, or there may be dozens of or hundreds of or more terminals. In this scenario, another terminal may be further included in the application environment. The number and the device type of the terminal are not limited in the embodiments of the present disclosure.

After the implementation environment of the embodiments of the present disclosure is introduced, application scenes of the embodiments of the present disclosure are described below.

The technical solutions provided by the embodiments of the present disclosure can be used for migrating users in a group in a second application to a group in a first application. The application scenes of the embodiments of the present disclosure are further described below by two examples.

Example 1: There are an application A and an application B, and both the application A and the application B have a function of instant messaging. In the early stage of development, an enterprise uses the application A to communicate with customers. With the development of the enterprise and the Internet, the application A may not be able to meet the desirables of the enterprise to communicate with customers, for example, the number of friends allowed to be added in the application A is small. In this scenario, the enterprise may want to use the application B, which allows adding a larger number of friends, to communicate with customers. For the enterprise, directly abandoning the application A and using the application B will lead to the loss of users, and it will take a lot of time to introduce original customers into the application B one by one through the application A. In addition, in the process of introducing customers in the application A into the application B, the enterprise also uses both the application A and the application B to maintain communication with customers. However, using the application A and the application B at the same time may easily cause message omission, which will lead to a decrease in the efficiency of communication with customers. In this scenario, the enterprise can use the technical solutions provided by the embodiments of the present disclosure to quickly migrate the customers in the application A to the application B, to improve the efficiency of customer migration.

Example 2: An application development enterprise develops an application C and an application D at the same time. When the application development enterprise wants to abandon the operation of one application and focus on the operation of another application, the application development enterprise can use the technical solutions provided by the present disclosure to migrate users in the application to be abandoned to another application, to retain the number of users to the maximum extent. For example, if the application development enterprise wants to abandon the operation of the application C and focus on the maintenance and operation of the application D, the application development enterprise can open interfaces using the technical solutions provided by the embodiments of the present disclosure in the application C and the application D for users to use, to realize the migration of users in the application C to the application D.

After the application scenes of the embodiments of the present disclosure are introduced, the technical solutions provided by the embodiments of the present disclosure are described below.

In the embodiments of the present disclosure, the technical solutions of a terminal side and a server side are included, and the technical solutions of the terminal side and the server side correspond to each other. Since the technical solution of the terminal side is more visible and easy to understand, in the following description process, the technical solution of the terminal side is first described with reference to the drawings, and the technical solution of the server side is described.

Figure 2:
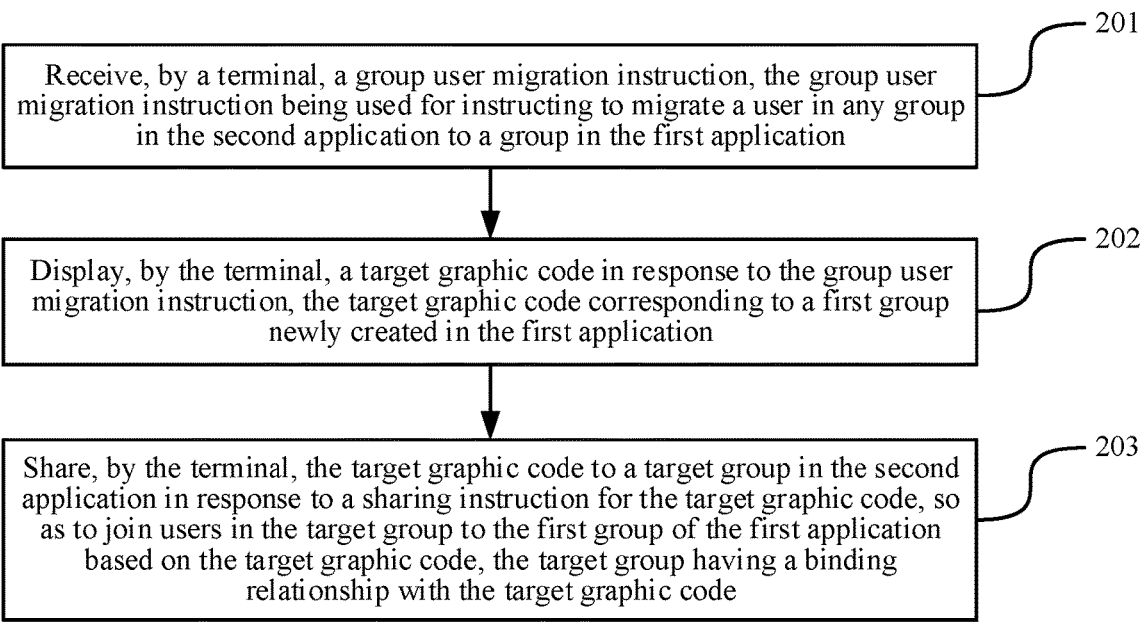
FIG. 2 is a schematic flowchart of a group user migration method according to certain embodiment(s) of the present disclosure.

FIG. 2 is a flowchart of a group user migration method provided by an embodiment of the present disclosure. Referring to FIG. 2, the method includes:

201: Receive, by a terminal, a group user migration instruction, the group user migration instruction being used for instructing to migrate a user in any group in the second application to a group in the first application.

The first application and the second application are applications capable of performing user data intercommunication. In some embodiments, an account in the second application can be directly used for logging on to the first application.

In an embodiment, the group user migration instruction is triggered by the terminal in response to the operation of a user on the first application, the first application and the second application are installed on the terminal at the same time, and both the first application and the second application are applications capable of creating groups.

202: Display, by the terminal, a target graphic code in response to the group user migration instruction, the target graphic code corresponding to a first group created in the first application.

In an embodiment, the target graphic code is a two-dimensional code or a bar code, which is not limited in the embodiments of the present disclosure. The first group is a group created while creating the target graphic code, and users in any group in the second application can join the first group of the first application by scanning the target graphic code.

203: Share, by the terminal, the target graphic code to a target group in the second application in response to a sharing instruction for the target graphic code, to join users in the target group to the first group of the first application based on the target graphic code, the target group having a binding relationship with the target graphic code.

The target group is determined by the terminal based on the operation of the user, that is, the user decides which group in the second application to share the target graphic code to. In some embodiments, the establishment of a binding relationship between a target group and a graphic code is performed by a server.

Through the technical solutions provided by the embodiments of the present disclosure, when an application program is replaced, it is doable to create a target graphic code on the first application, and share the target graphic code to a target group in the second application. Users in the target group can quickly join the group in the first application by the target graphic code, so that the efficiency of group user migration is higher. In addition, since the target group has a binding relationship with the target graphic code, it means that only users in the target group can join the first group based on the target graphic code, and users in other groups in the second application cannot join the first group based on the target graphic code. As a result, one group having one code is achieved, and the security of the target graphic code is higher.

Figure 3:
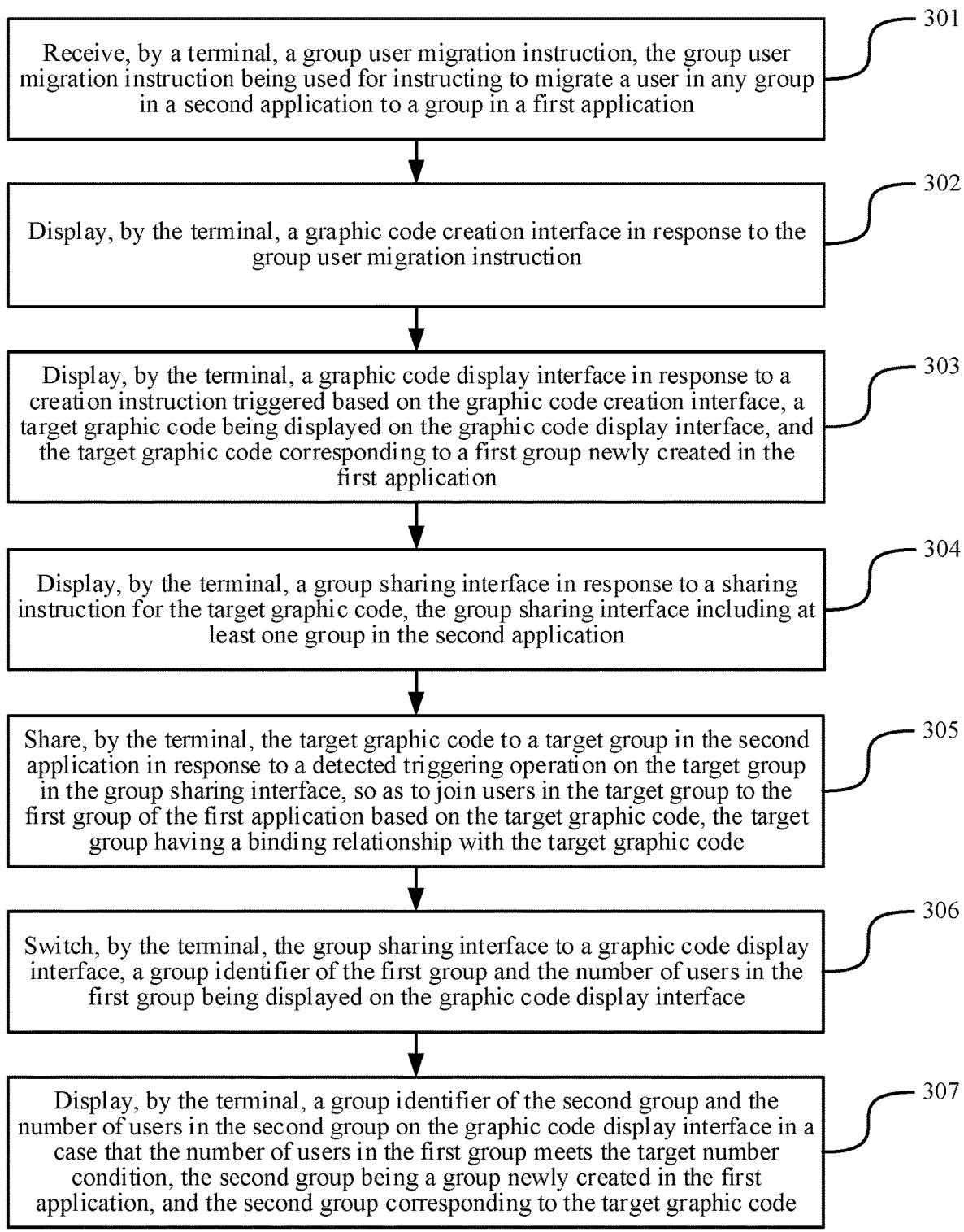
FIG. 3 is a schematic flowchart of a group user migration method according to certain embodiment(s) of the present disclosure.

FIG. 3 is a flowchart of a group user migration method provided by an embodiment of the present disclosure. Referring to FIG. 3, the method includes:

301: Receive, by the terminal, a group user migration instruction, the group user migration instruction being used for instructing to migrate a user in any group in the second application to a group in the first application.

In an embodiment, a first group user migration interface of the first application is displayed on a terminal, and a group user migration control is displayed on the first group user migration interface. The terminal triggers a group user migration instruction in response to a triggering operation on the group user migration control.

By this implementation, when a user wants to migrate a user in any group in the second application to the first application, the group user migration instruction can be quickly triggered by the first group user migration interface provided by the first application, to perform the subsequent group user migration.

Figure 4:
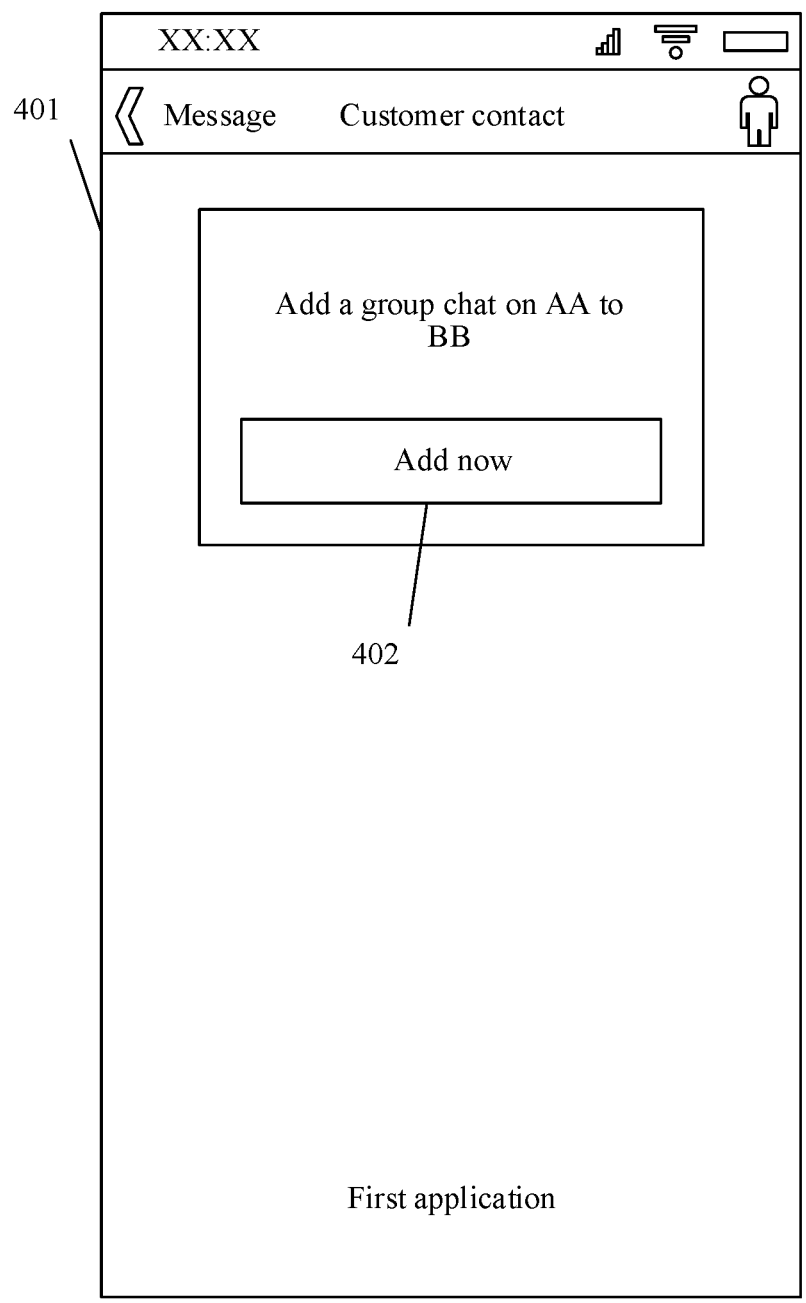
FIG. 4 is a schematic diagram of an interface according to certain embodiment(s) of the present disclosure.
Figure 5:
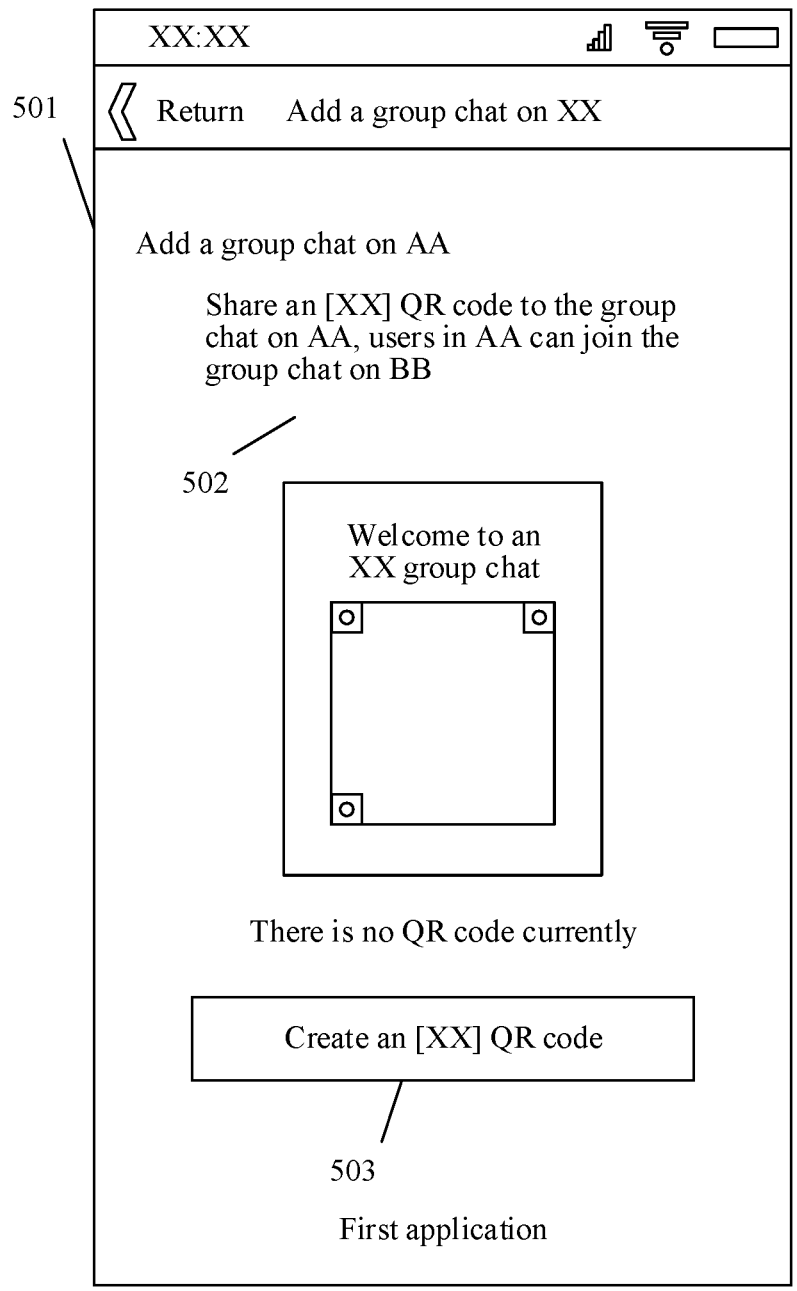
FIG. 5 is a schematic diagram of an interface according to certain embodiment(s) of the present disclosure.

For example, referring to FIG. 4, a group chat adding interface 401 of the first application is displayed on a terminal, and a group chat adding control 402 is displayed on the group chat adding interface 401. When a user wants to migrate a user in any group in a first application "AA" to a second application "BB", a display instruction of a first group user migration interface can be triggered by tapping the group chat adding control 402. Referring to FIG. 5, the terminal switches the group chat adding interface 401 to a first group user migration interface 501 in response to the display instruction of the first group user migration interface, a function introduction 502 of the interface and a group user migration control 503 are displayed on the first group user migration interface 501, and the user can quickly trigger the group user migration instruction by tapping the group user migration control 503.

In an embodiment, the group user migration instruction may further be triggered by an operation performed by the user on the second application, that is, a second group user migration interface of the second application is displayed on the terminal, and a group user migration control is displayed on the second group user migration interface. The terminal triggers the group user migration instruction in response to the detected triggering operation on the group user migration control.

By this implementation, when a user wants to migrate a user in any group in the second application to the first application, the group user migration instruction can further be quickly triggered directly by the second group user migration interface provided by the second application, to perform the subsequent group user migration.

Figure 6:
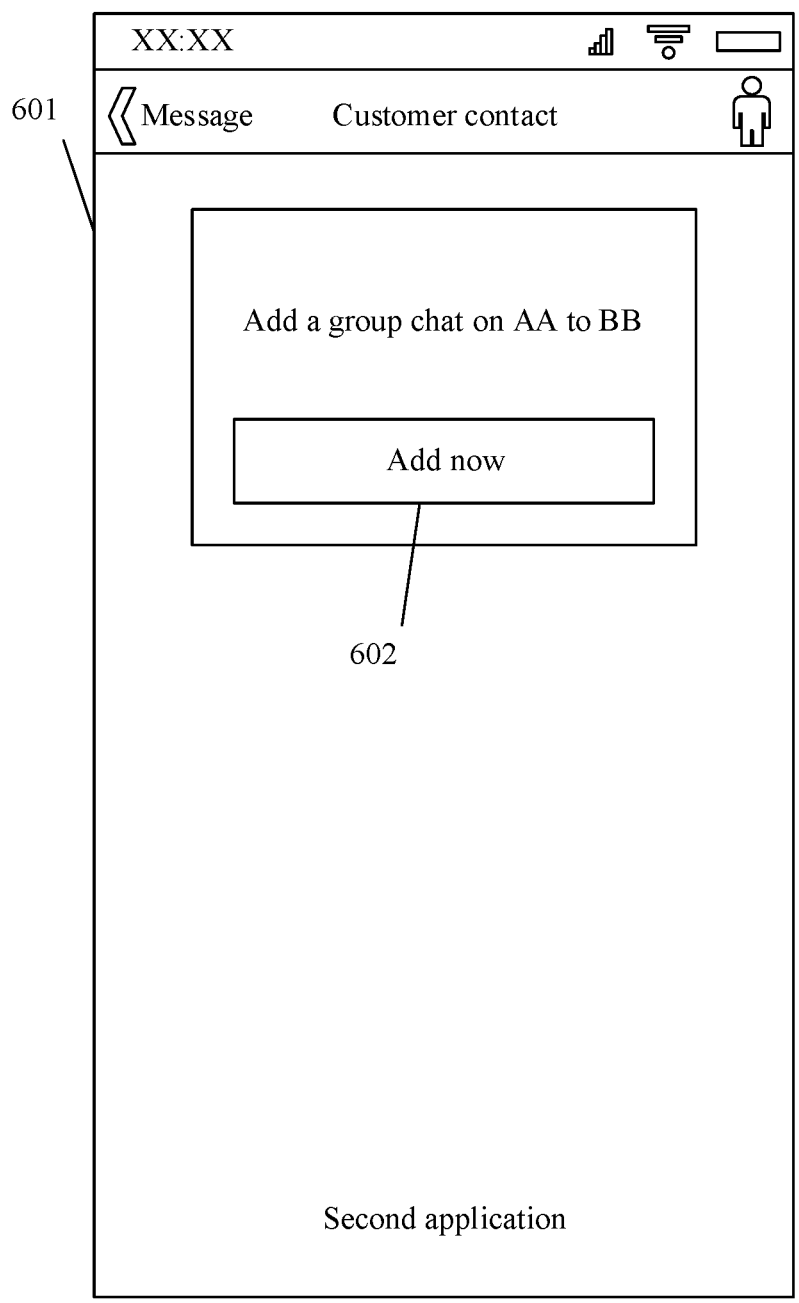
FIG. 6 is a schematic diagram of an interface according to certain embodiment(s) of the present disclosure.
Figure 7:
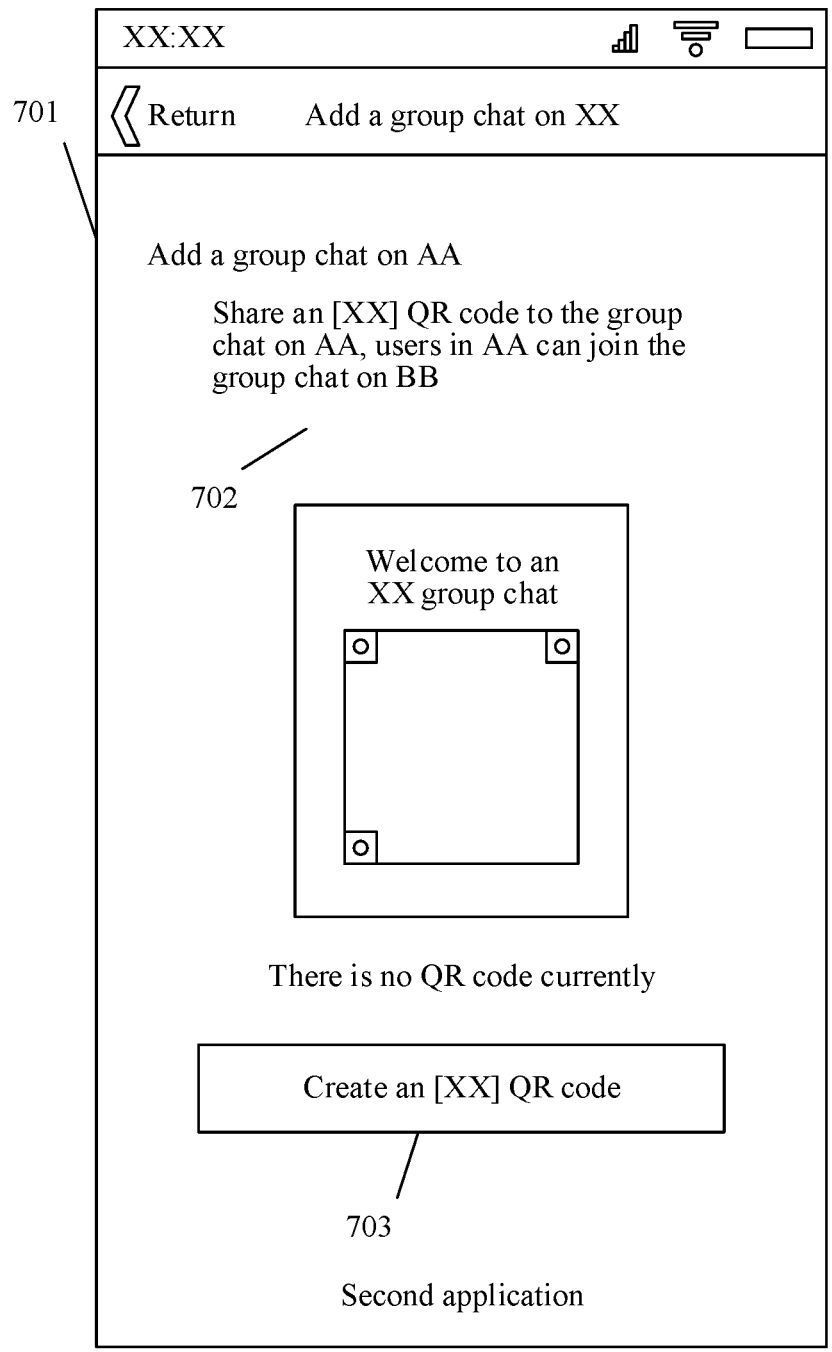
FIG. 7 is a schematic diagram of an interface according to certain embodiment(s) of the present disclosure.

For example, referring to FIG. 6, a group chat adding interface 601 of the second application is displayed on a terminal, and a group chat adding control 602 is displayed on the group chat adding interface. When a user wants to migrate a user in any group in a first application "AA" to a second application "BB", a display instruction of a second group user migration interface can be triggered by tapping the group chat adding control 602. Referring to FIG. 7, the terminal switches the group chat adding interface 601 to a second group user migration interface 701 in response to the display instruction of the second group user migration interface, a function introduction 702 of the interface and a group user migration control 703 are displayed on the second group user migration interface 701, and the user can quickly trigger the group user migration instruction by tapping the group user migration control 703.

In an embodiment, if a user triggers a group user migration instruction by a first terminal, after the terminal receives the group user migration instruction, the following step 302 can be performed, and any one of the following methods can further be performed first.

In an embodiment, a first account is logged on to the first application, and when or in response to determining that the first account is not bound to any target account, a terminal displays an account unbinding prompt. In some embodiments, the account unbinding prompt is "You have not bound the XX account, you can use it after binding". When or in response to determining that the first account is bound to any target account, and any target account is in a banned state, the terminal displays an account banning prompt. In some embodiments, the account banning prompt is "The bound XX account is abnormal, please cancel it in XX before operating". The target account is an account registered in a second application. In other words, before step 302 is performed, the terminal can verify the first account logged on to the first application. When or in response to determining that the first account is not bound to any target account, it means that a relationship between the first account and the second application cannot be established, and the terminal can display the account unbinding prompt. The user can know that the first account is not bound to any target account by the account unbinding prompt, and the user can subsequently perform a binding process between the first account and the target account. When or in response to determining that the first account is bound to any target account, but the target account bound to the first account is in a banned state, the terminal can display the account banning prompt. The user can know that the target account bound to the first account is banned by the account banning prompt, and can subsequently unbind the first account from the target account or release the banned state of the target account.

For example, after receiving a group user migration instruction, a terminal can send a binding relationship verification request to a first application server, and the binding relationship verification request is used for obtaining a binding relationship between a first account and any target account, where the binding relationship verification request carries the first account. In some embodiments, referring to FIG. 4, the binding relationship verification request is triggered when the terminal detects a tapping operation on the group chat adding control 402. After receiving the binding relationship verification request, the first application server can obtain the first account from the binding relationship verification request, and query a binding situation between the first account and the target account in a binding relationship database. When the first application server determines that there is no binding relationship between the first account and any target account, the first application server can send information that the binding relationship does not exist to the terminal. The terminal displays the account unbinding prompt in response to the received information that the binding relationship does not exist. When the first application server determines that there is a binding relationship between the first account and any target account, but the target account is in a banned state, the first application server can send account banning information to the terminal. The terminal displays the account banning prompt in response to the received account banning information.

302: Display, by the terminal, a graphic code creation interface in response to the group user migration instruction.

In an embodiment, if a user triggers a group user migration instruction by a first group user migration interface displayed on a terminal, the terminal switches the first group user migration interface to a graphic code creation interface of the first application in response to the group user migration instruction. In some embodiments, a user can set an identifier for a target graphic code on a graphic code creation interface of the first application, and a terminal can obtain the characters inputted by the user on the graphic code creation interface of the first application as the identifier of the target graphic code.

Figure 8:
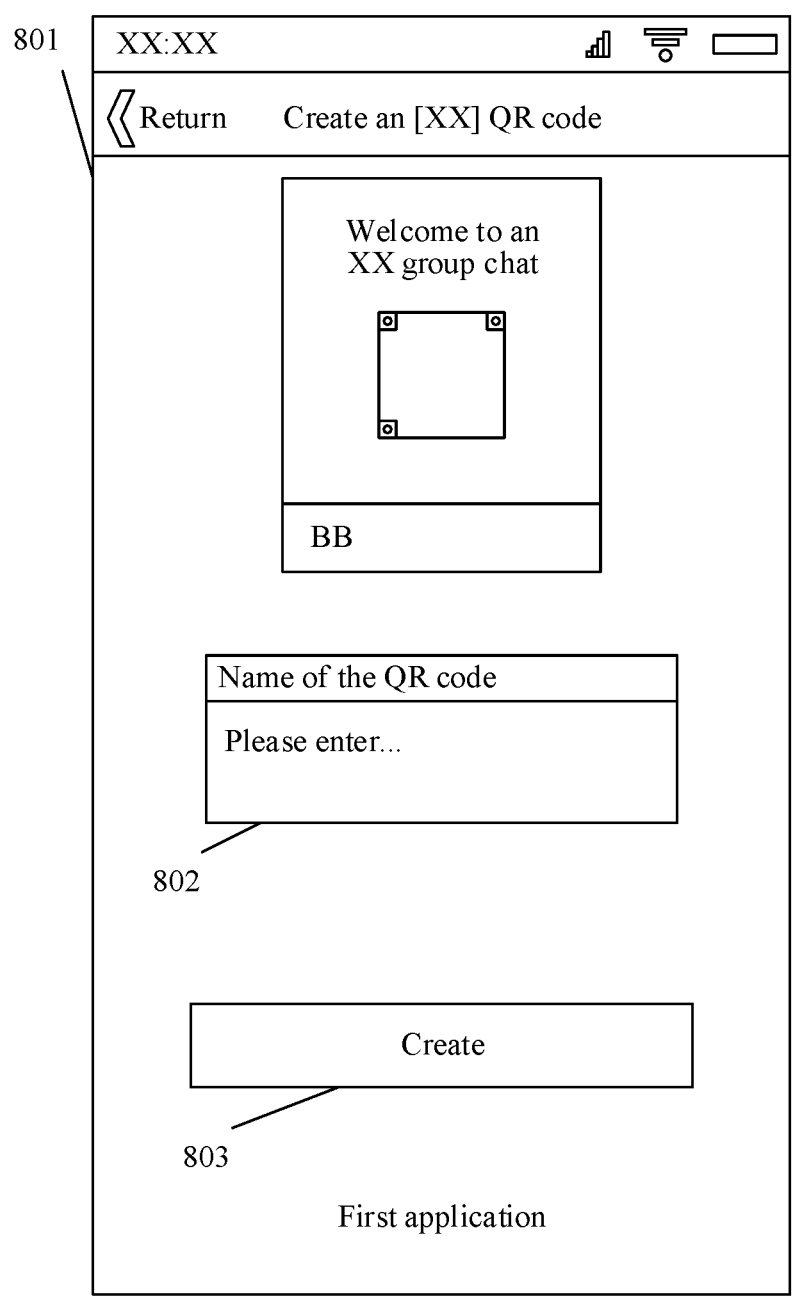
FIG. 8 is a schematic diagram of an interface according to certain embodiment(s) of the present disclosure.

For example, referring to FIG. 5 and FIG. 8, a terminal can switch the first group user migration interface 501 in FIG. 5 to a graphic code creation interface 801 of the first application in FIG. 8 in response to a group user migration instruction, and a graphic code identifier input box 802 is displayed on the graphic code creation interface 801. In some embodiments, an identifier of a target graphic code is also a name of the target graphic code, and a user can input the name of the target graphic code in the graphic code identifier input box 802. A terminal can obtain the characters in the graphic code identifier input box 802 as the name of the target graphic code.

In an embodiment, if a user triggers a group user migration instruction by a second group user migration interface displayed on a terminal, the terminal switches the second group user migration interface to a graphic code creation interface of the second application in response to the group user migration instruction. In some embodiments, a user can set an identifier for a target graphic code on a graphic code creation interface of the second application, and a terminal can obtain the characters inputted by the user on the graphic code creation interface as the identifier of the target graphic code.

Figure 9:
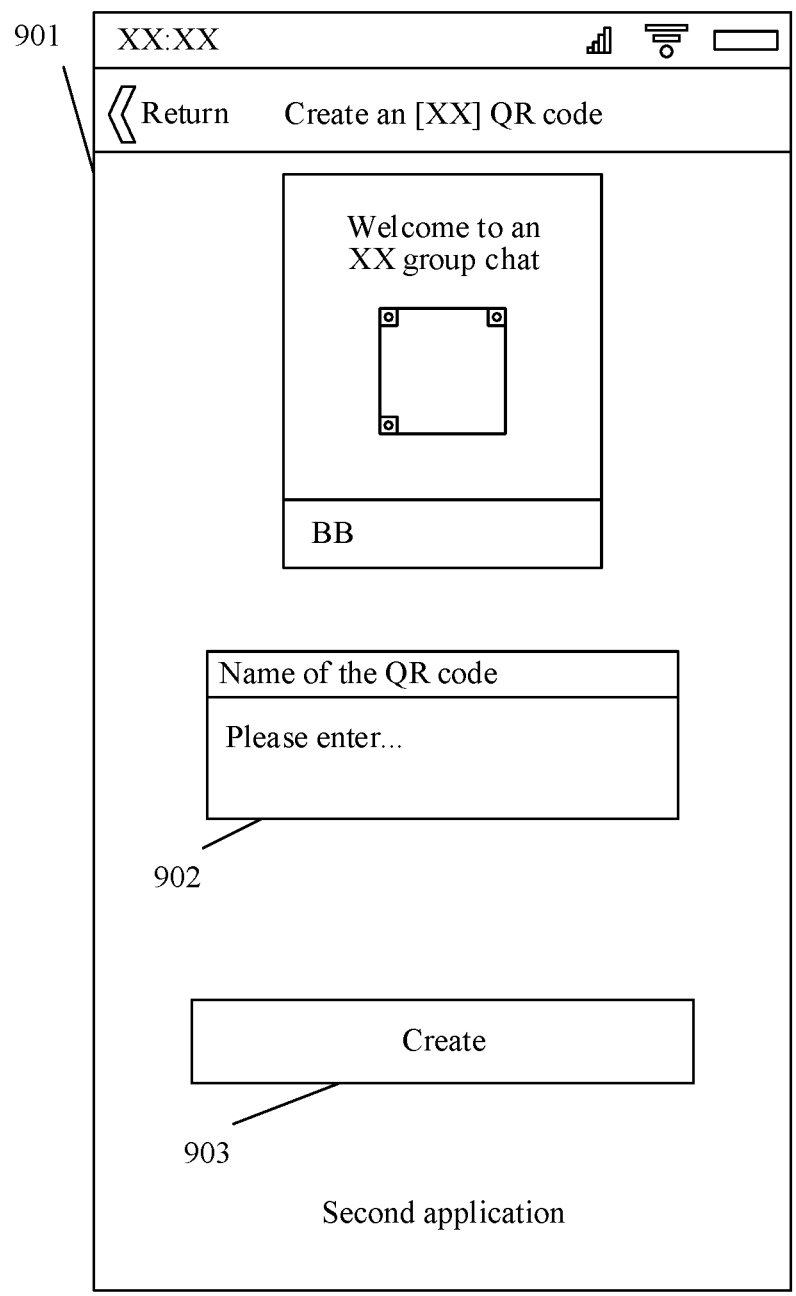
FIG. 9 is a schematic diagram of an interface according to certain embodiment(s) of the present disclosure.

For example, referring to FIG. 7 and FIG. 9, a terminal can switch the second group user migration interface 701 in FIG. 7 to a graphic code creation interface 901 of the second application in FIG. 9 in response to a group user migration instruction, and a graphic code identifier input box 902 is displayed on the graphic code creation interface 901. In some embodiments, an identifier of a target graphic code is also a name of the target graphic code, and a user can input the name of the target graphic code in the graphic code identifier input box 902. A terminal can obtain the characters in the graphic code identifier input box as the name of the target graphic code.

In an embodiment, if a user triggers a group user migration instruction by a second group user migration interface displayed on a terminal, the terminal switches the second group user migration interface to a graphic code creation interface of the first application in response to the group user migration instruction. In some embodiments, a user can input a desired identifier set for a target graphic code on a graphic code creation interface of the first application, and a terminal can obtain the characters inputted by the user on the graphic code creation interface of the first application as the identifier of the target graphic code.

For example, referring to FIG. 7 and FIG. 8, a terminal can switch a second application to a first application, that is, switch the second group user migration interface 701 in FIG. 7 to the graphic code creation interface 801 of the first application in FIG. 8 in response to a group user migration instruction, and the graphic code identifier input box 802 is displayed on the graphic code creation interface 801. In some embodiments, an identifier of a target graphic code is also a name of the target graphic code, and a user can input the name of the target graphic code in the graphic code identifier input box 802. A terminal can obtain the characters in the graphic code identifier input box as the name of the target graphic code.

303: Display, by the terminal, a graphic code display interface in response to a creation instruction triggered based on the graphic code creation interface, a target graphic code being displayed on the graphic code display interface, and the target graphic code corresponding to a first group created in the first application.

In an embodiment, a group identifier of a first group is associated with an identifier of a target graphic code, where the association of the group identifier of the first group with the identifier of the target graphic code means that the group identifier of the first group and the identifier of the target graphic code have the same part. Taking an identifier as a name as an example for illustration, if the name of the target graphic code is "fruit group", the group identifier of the first group is "fruit group 1". In this scenario, a user sets a name for the target graphic code, and the name of the first group can be automatically generated. The efficiency of human-computer interaction is higher. In some embodiments, a user can further set a validity period for a target graphic code, for example, set the target graphic code to be permanently valid or to be valid within 7 days, which is not limited in the embodiments of the present disclosure.

In an embodiment, a graphic code creation interface of the first application is displayed on a terminal, and a graphic code creation control is displayed on the graphic code creation interface of the first application. The terminal triggers a creation instruction in response to a detected tapping operation on the graphic code creation control. The terminal switches the graphic code creation interface of the first application to a graphic code display interface of the first application in response to the creation instruction triggered based on the graphic code creation interface, the created target graphic code is displayed on the graphic code display interface of the first application, the target graphic code corresponds to the first group created in the first application, and users can join the first group by scanning the target graphic code.

Figure 10:
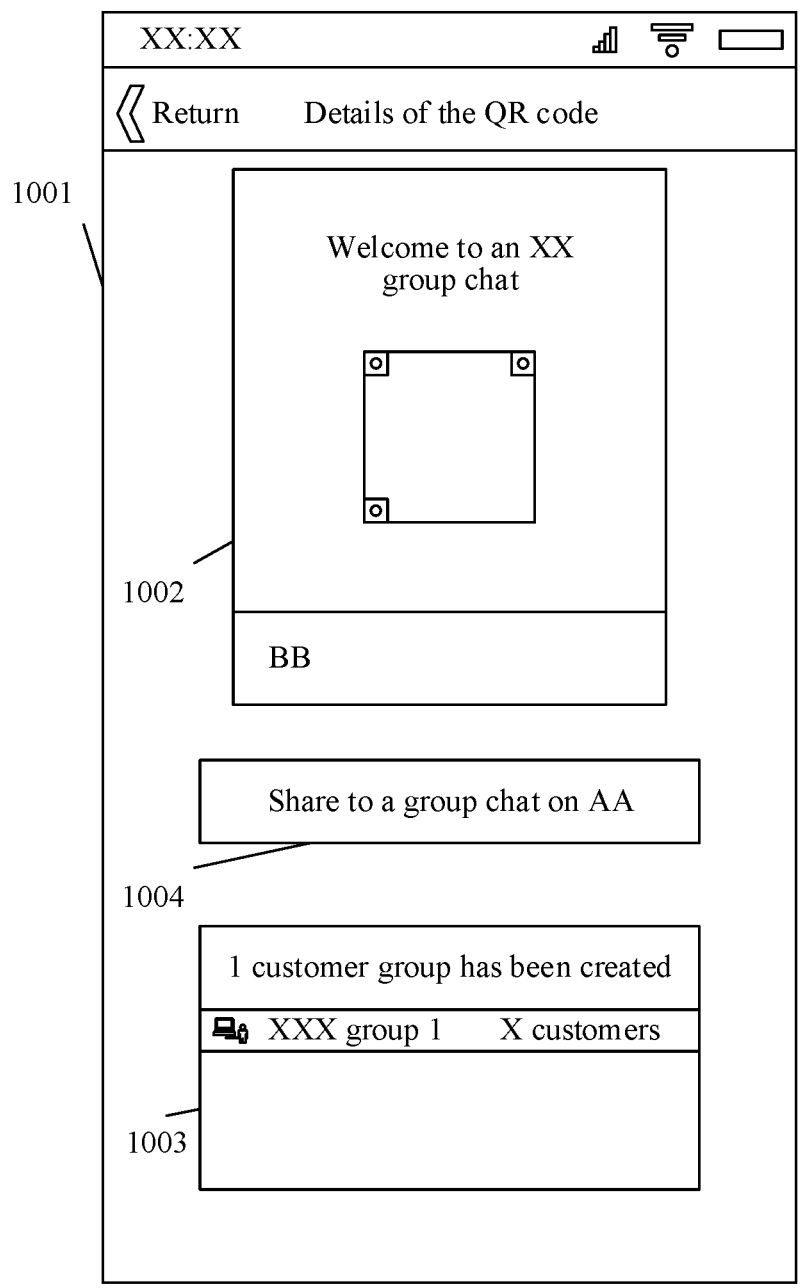
FIG. 10 is a schematic diagram of an interface according to certain embodiment(s) of the present disclosure.

For example, referring to FIG. 8 and FIG. 10, the graphic code creation interface 801 of the first application is displayed on the terminal, and the graphic code identifier input box 802 and a graphic code creation control 803 are displayed on the graphic code creation interface 801. After a user inputs an identifier of a target graphic code in the graphic code identifier input box 802, the creation of the target graphic code can be performed by tapping the graphic code creation control. For the terminal, the terminal triggers a creation instruction in response to a detected tapping operation on the graphic code creation control 803. The terminal switches the graphic code creation interface 801 to a graphic code display interface 1001 of the first application in response to the creation instruction triggered based on the graphic code creation interface 801, that is, the creation instruction triggered by the user tapping the graphic code creation control 803. A target graphic code 1002 is displayed in the graphic code display interface 1001. After the user shares the target graphic code 1002 to other users, the other users can join the first group corresponding to the target graphic code 1002 by identifying the graphic code 1002. In some embodiments, group information 1003 corresponding to a target graphic code is further displayed on the graphic code display interface 1001, and a group identifier of a first group and the number of users in the first group are displayed in the group information 1003.

In an embodiment, a graphic code creation interface of the second application is displayed on a terminal, and a graphic code creation control is displayed on the graphic code creation interface of the second application. The terminal triggers a creation instruction in response to a detected triggering operation on the graphic code creation control. The terminal switches the graphic code creation interface of the second application to a graphic code display interface of the second application in response to the creation instruction triggered based on the graphic code creation interface, the created target graphic code is displayed on the graphic code display interface of the second application, the target graphic code corresponds to the first group created in the first application, and users can join the first group by scanning the target graphic code.

Figure 11:
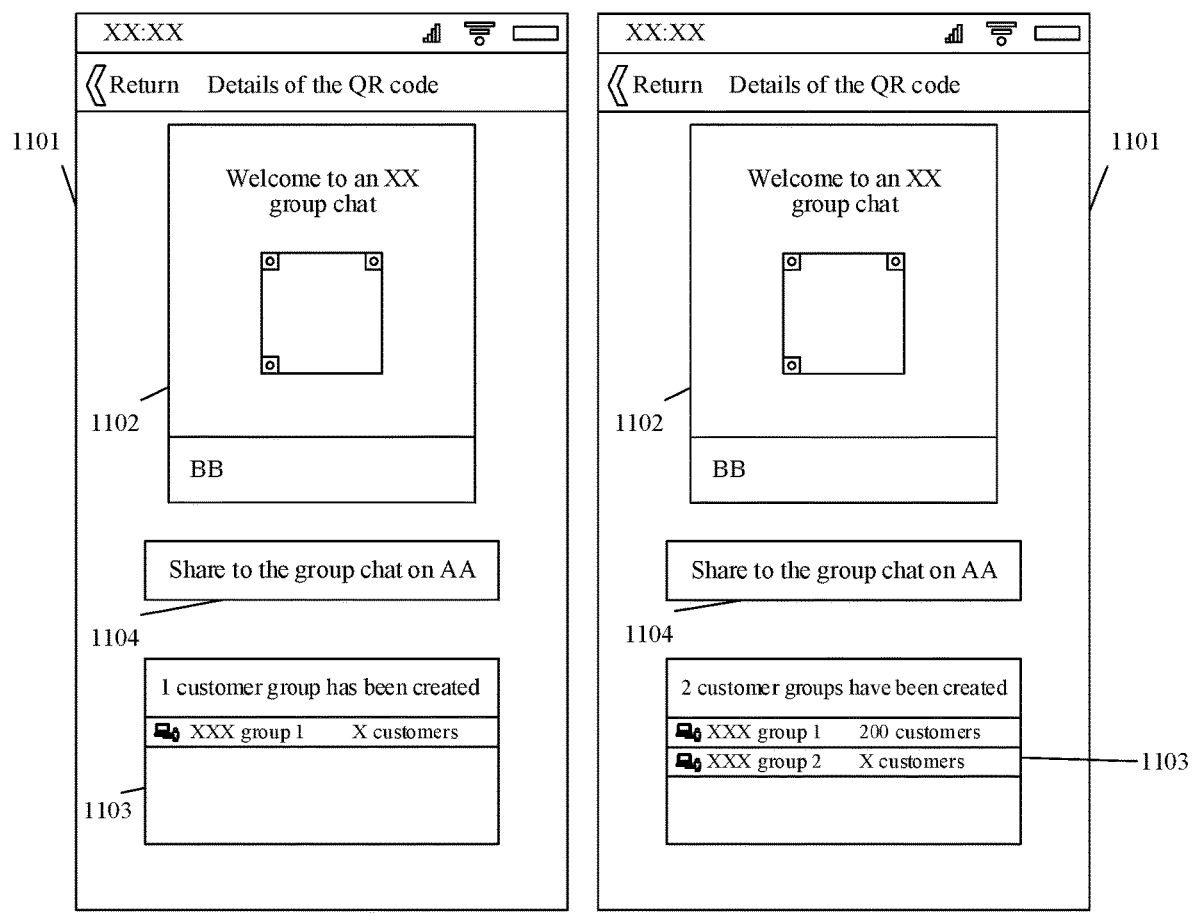
FIG. 11 is a schematic diagram of an interface according to certain embodiment(s) of the present disclosure.

For example, referring to FIG. 9 and FIG. 11, the graphic code creation interface 901 of the second application is displayed on the terminal, and the graphic code identifier input box 902 and a graphic code creation control 903 are displayed on the graphic code creation interface 901. After a user inputs an identifier of a target graphic code in the graphic code identifier input box 902, the creation of the target graphic code can be performed by tapping the graphic code creation control. For the terminal, the terminal triggers a creation instruction in response to a detected tapping operation on the graphic code creation control 903. The terminal switches the graphic code creation interface 901 to a graphic code display interface 1101 of the second application in response to the creation instruction triggered based on the graphic code creation interface 901, that is, the creation instruction triggered by the user tapping the graphic code creation control 903. A target graphic code 1102 is displayed in the graphic code display interface 1101. After the user shares the target graphic code 1102 to other users, the other users can join the first group corresponding to the target graphic code 1102 by identifying the graphic code 1102. In some embodiments, group information 1103 corresponding to a target graphic code is further displayed on the graphic code display interface 1101, and a group identifier of a first group and the number of users in the first group are displayed in the group information 1103.

In an embodiment, a graphic code creation interface of the second application is displayed on a terminal, and a graphic code creation control is displayed on the graphic code creation interface of the second application. The terminal triggers a creation instruction in response to a detected triggering operation on the graphic code creation control. The terminal switches the graphic code creation interface of the second application to a graphic code display interface of the first application in response to the creation instruction triggered based on the graphic code creation interface, the created target graphic code is displayed on the graphic code display interface of the first application, the target graphic code corresponds to the first group created in the first application, and users can join the first group by scanning the target graphic code.

For example, referring to FIG. 9 and FIG. 10, the graphic code creation interface 901 of the second application is displayed on the terminal, and the graphic code identifier input box 902 and the graphic code creation control 903 are displayed on the graphic code creation interface 901. After a user inputs an identifier of a target graphic code in the graphic code identifier input box 902, the creation of the target graphic code can be performed by tapping the graphic code creation control. For the terminal, the terminal triggers a creation instruction in response to a detected triggering operation on the graphic code creation control 903. The terminal switches the graphic code creation interface 901 to the graphic code display interface 1001 of the first application in response to the creation instruction triggered based on the graphic code creation interface 901. A target graphic code 1002 is displayed in the graphic code display interface 1001. After the user shares the target graphic code 1002 to other users, the other users can join the first group corresponding to the target graphic code 1002 by identifying the graphic code 1002. In some embodiments, group information 1003 corresponding to a target graphic code is further displayed on the graphic code display interface 1001, and a group identifier of a first group and the number of users in the first group are displayed in the group information 1003.

304: Display, by the terminal, a group sharing interface in response to the sharing instruction for the target graphic code, the group sharing interface including at least one group in the second application.

In an embodiment, a graphic code display interface of the first application is displayed on a terminal, and a graphic code sharing control is displayed on the graphic code display interface of the first application. The terminal triggers a sharing instruction for a target graphic code in response to a detected tapping operation on the graphic code sharing control. The terminal switches the graphic code display interface of the first application to a group sharing interface of the second application in response to the sharing instruction for the target graphic code, and a user can select a group to which the target graphic code is to be shared in the group sharing interface of the second application.

Figure 12:
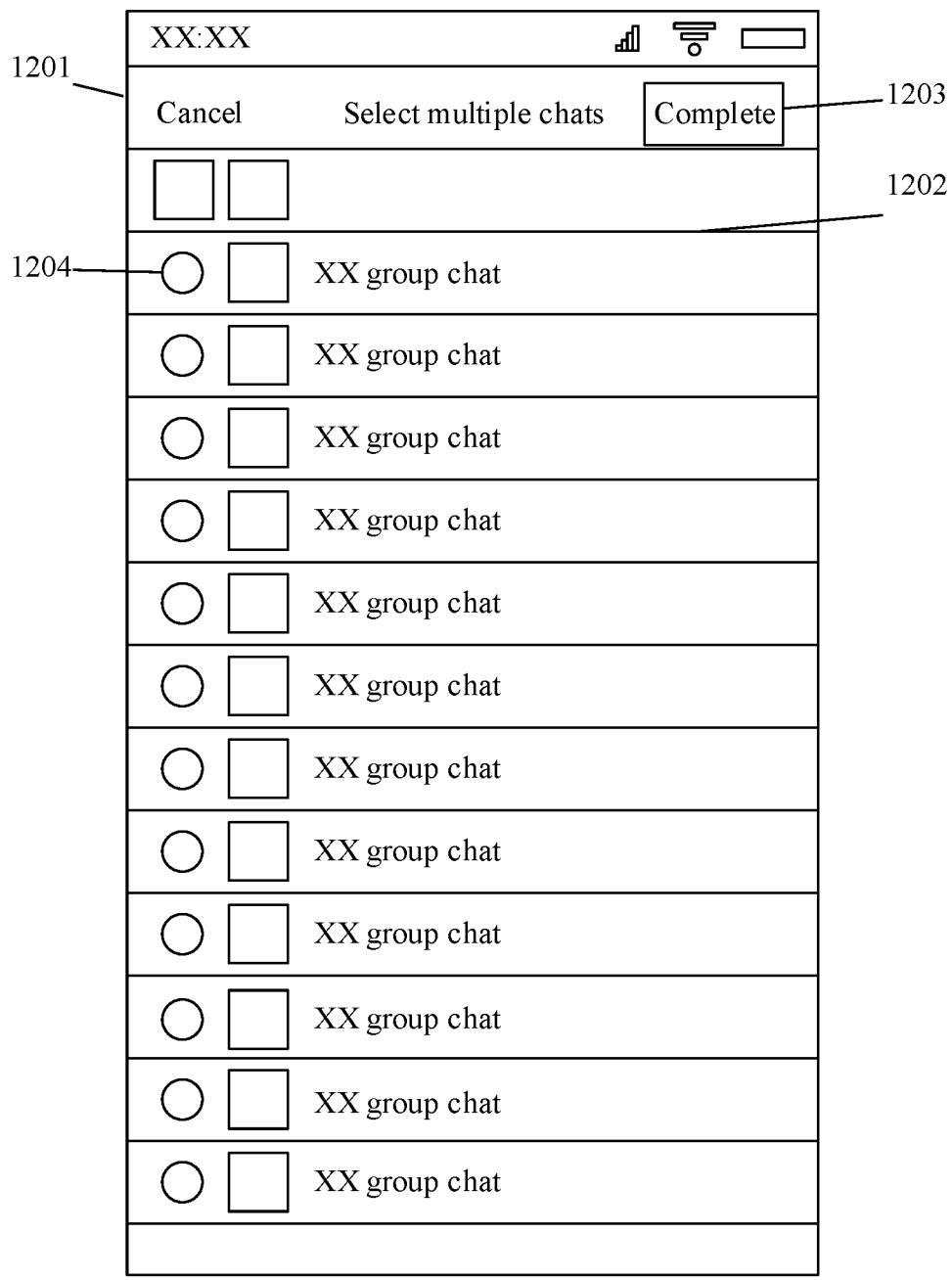
FIG. 12 is a schematic diagram of an interface according to certain embodiment(s) of the present disclosure.

For example, referring to FIG. 10 and FIG. 12, the graphic code display interface 1001 of the first application is displayed on the terminal, and a graphic code sharing control 1004 is displayed in the graphic code display interface 1001. The user can control the terminal to switch the graphic code display interface of the first application to a group sharing interface 1201 of the second application by tapping the graphic code sharing control 1004. For the terminal, the terminal switches the graphic code display interface 1001 of the first application to the group sharing interface 1201 of the second application in response to a detected tapping operation on the graphic code sharing control 1004. In some embodiments, a group identifier and a group avatar 1202 of at least one group in the second application are displayed in the group sharing interface 1201 of the second application, and a user can select a group to which a target graphic code is to be shared by the group sharing interface 1201.

In an embodiment, a graphic code display interface of the second application is displayed on a terminal, and a graphic code sharing control is displayed on the graphic code display interface of the second application. The terminal triggers a sharing instruction for a target graphic code in response to a detected tapping operation on the graphic code sharing control. The terminal switches the graphic code display interface of the second application to a group sharing interface of the second application in response to the sharing instruction for the target graphic code, and a user can select a group to which the target graphic code is to be shared in the group sharing interface of the second application.

For example, referring to FIG. 11 and FIG. 12, the graphic code display interface 1101 of the second application is displayed on the terminal, and a graphic code sharing control 1104 is displayed in the graphic code display interface 1101. The user can control the terminal to switch the graphic code display interface of the second application to the group sharing interface 1201 of the second application by tapping the graphic code sharing control 1104. For the terminal, the terminal switches the graphic code display interface 1101 of the first application to the group sharing interface 1201 of the second application in response to a detected tapping operation on the graphic code sharing control 1104. In some embodiments, a group identifier and a group avatar 1202 of at least one group in the second application are displayed in the group sharing interface 1201 of the second application, and a user can select a group to which a target graphic code is to be shared by the group sharing interface 1201.

In the above description process, the terminal on which the first application and the second application are installed at the same time is taken as an example for illustration. If the second application is installed on the terminal, the terminal can display a group sharing interface. If the second application is not installed on the terminal, the terminal can display a prompt that the second application is not installed.

In some embodiments, if the second application is not installed, a prompt is "Sharing failed, please install the second application and try again".

In an embodiment, in response to a sharing instruction for a target graphic code, in addition to directly displaying a group sharing interface, a terminal can further verify the accounts logged on to the first application and the second application before displaying the group sharing interface. Methods for verifying accounts are as follows.

In an embodiment, a first account is logged on to the first application, and a second account is logged on to the second application. When or in response to determining that the second account is different from a third account, a terminal displays an account switching prompt, and the account switching prompt is used for prompting to use the third account to log on to the second application. The third account is an account registered in the second application and bound to the first account. In some embodiments, the account switching prompt is "Please use the bound XX account to log on to the second application".

By this implementation, when or in response to determining that the first account logged on to the first application does not have a binding relationship with the second account logged on to the second application, the terminal can remind the user to log on to a third application by using the second account having a binding relationship with the first account by displaying the account switching prompt. That is, the user can only share the target graphic code to his own account, and the user can only migrate group users in his own account, to prevent the user from abusing the group user migration method provided by the embodiments of the present disclosure and causing harassment to other users.

For example, a terminal sends an account verification request to a first application server in response to a sharing instruction for a target graphic code, the account verification request carries a first account and a second account, and the account verification request is used for obtaining a binding relationship between the first account and the second account. In some embodiments, referring to FIG. 12, the account verification request is triggered when the terminal detects a tapping operation on the graphic code sharing control 1004. After receiving the account verification request, the server can obtain the first account and the second account from the account verification request, and query a binding situation between the first account and the second account in a binding relationship database. When the first application server determines that the first account is not bound to the second account, the first application server sends binding relationship error information to the terminal. The terminal displays an account switching prompt in response to the received binding relationship error information. When the first application server determines that the first account is bound to the second account, the first application server sends binding relationship correct information to the terminal. The terminal displays a group sharing interface in response to the received binding relationship correct information.

After performing step 304, the terminal may further selectively perform the following steps 305-307, which is not limited in the embodiments of the present disclosure.

305: Share, by the terminal, the target graphic code to a target group in the second application in response to a detected triggering operation on the target group in the group sharing interface, to join users in the target group to the first group of the first application based on the target graphic code, the target group having a binding relationship with the target graphic code.

In an embodiment, a terminal displays a sharing confirmation interface in response to a detected triggering operation on a target group in a group sharing interface, and a group identifier of the target group and a sharing confirmation control are displayed on the sharing confirmation interface. The terminal shares a target graphic code to a target group in the second application in response to a detected tapping operation on the sharing confirmation control. Users in the target group can join the first group of the first application by identifying the target graphic code, to realize the purpose of migrating the users in the target group to the first group of the first application. Since the target group has a binding relationship with the target graphic code, in some embodiments, if users in the target group share the target graphic code to other groups in the second application, users in other groups cannot join the first group by the target graphic code.

Figure 13:
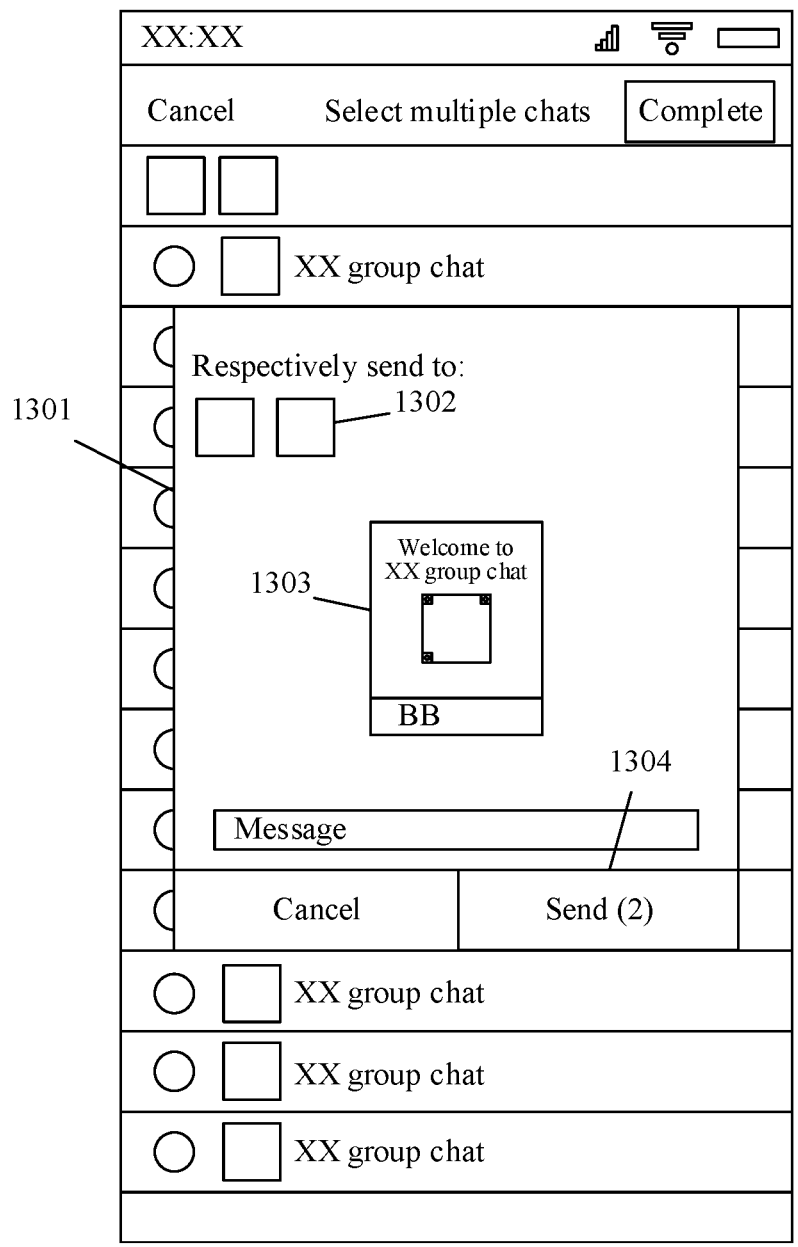
FIG. 13 is a schematic diagram of an interface according to certain embodiment(s) of the present disclosure.

For example, referring to FIG. 12 and FIG. 13, a group sharing interface 1201 of the second application is displayed on a terminal, and at least one piece of group information 1202 in the second application and a group sharing control 1203 are displayed on the group sharing interface 1201. A user can select a group to which a graphic code is to be shared by tapping a selection box 1204 in front of the group information 1202. After the target group is selected by the selection box 1204, a sharing confirmation instruction can be triggered by tapping the group sharing control 1203. The terminal displays a sharing confirmation interface 1301 in response to the sharing confirmation instruction, and a group identifier 1302 of the target group, a target graphic code 1303 and a sharing confirmation control 1304 are displayed on the sharing confirmation interface 1301. The terminal shares the target graphic code to the target group in the second application in response to a detected tapping operation on the sharing confirmation control 1304, where the group identifier 1302 of the target group and the target graphic code 1303 are displayed to remind the user to confirm whether the selected group is the group to be shared.

306: Switch, by the terminal, the group sharing interface to a graphic code display interface, a group identifier of the first group and the number of users in the first group being displayed on the graphic code display interface.

In an embodiment, a terminal switches a group sharing interface to a graphic code display interface of the first application in response to a detected operation of sharing a target graphic code to a target group.

For example, referring to FIG. 10, the target graphic code 1002 and the group information 1003 corresponding to the target graphic code are displayed on the graphic code display interface 1001, and the group information 1003 includes a group identifier of the first group and the number of users in the first group. A user can quickly know the group identifier of the first group and the number of users in the first group by the group information 1003.

In some embodiments, a terminal displays a group session interface of the first group in response to a detected triggering operation on a group identifier of the first group. In other words, when the terminal displays a graphic code display interface, a user can quickly switch the graphic code display interface to the session interface of the first group by tapping the group identifier of the first group, and users in the first group communicate with each other. The efficiency of human-computer interaction is higher.

On the basis of the above implementations, the terminal can update the number of users in the first group on the graphic code display interface when or in response to determining that any user in the target group joins the first group.

In other words, when users in the target group join the first group by identifying the graphic code, the terminal can update the number of users in the first group displayed on the graphic code display interface, and the user can know the progress of migrating the users in the target group to the first group in real time. The efficiency of human-computer interaction is higher.

307: Display, by the terminal, a group identifier of the second group and the number of users in the second group on the graphic code display interface when or in response to determining that the number of users in the first group meets a target number condition, the second group being a group created in the first application, and the second group corresponding to the target graphic code.

The scenario that the number of users in the first group meets a target number condition means that the number of users in the first group is equal to a number threshold. In some embodiments, the number threshold is 200. The group identifier of the second group is associated with the group identifier of the first group and the identifier of the target graphic code. Taking an identifier as a name as an example for illustration, if the name of the target graphic code is "fruit group", the group identifier of the first group is "fruit group 1", and the group identifier of the second group is "fruit group 2". In this scenario, a user sets a name for the target graphic code, and the name of the first group can be automatically generated; and moreover, when the second group is created again, the second group can automatically use the name of the first group. The efficiency of human-computer interaction is higher. In some embodiments, a target graphic code can correspond to 100 groups. In other words, when or in response to determining that the number of users in the second group meets a target number condition, a terminal can further display a group identifier of a third group and the number of users in the third group on a graphic code display interface, and so on.

By performing step 307, when users in the first group are full, the second group can be automatically created; and when users in the first group are full, users in the target group can directly join the second group by identifying the target graphic code again. Furthermore, the terminal can further display related information of the second group on the graphic code display interface, and the user can quickly know the number of users in the second group by the graphic code display interface. The efficiency of human-computer interaction is higher.

In an embodiment, before step 301, a terminal can further perform the following steps.

In an embodiment, a first account is logged on to the first application, a terminal displays a group display interface when or in response to determining that any graphic code is created by the first account, and an identifier of the graphic code and the number of groups corresponding to the graphic code are displayed on the group display interface.

Figure 14:
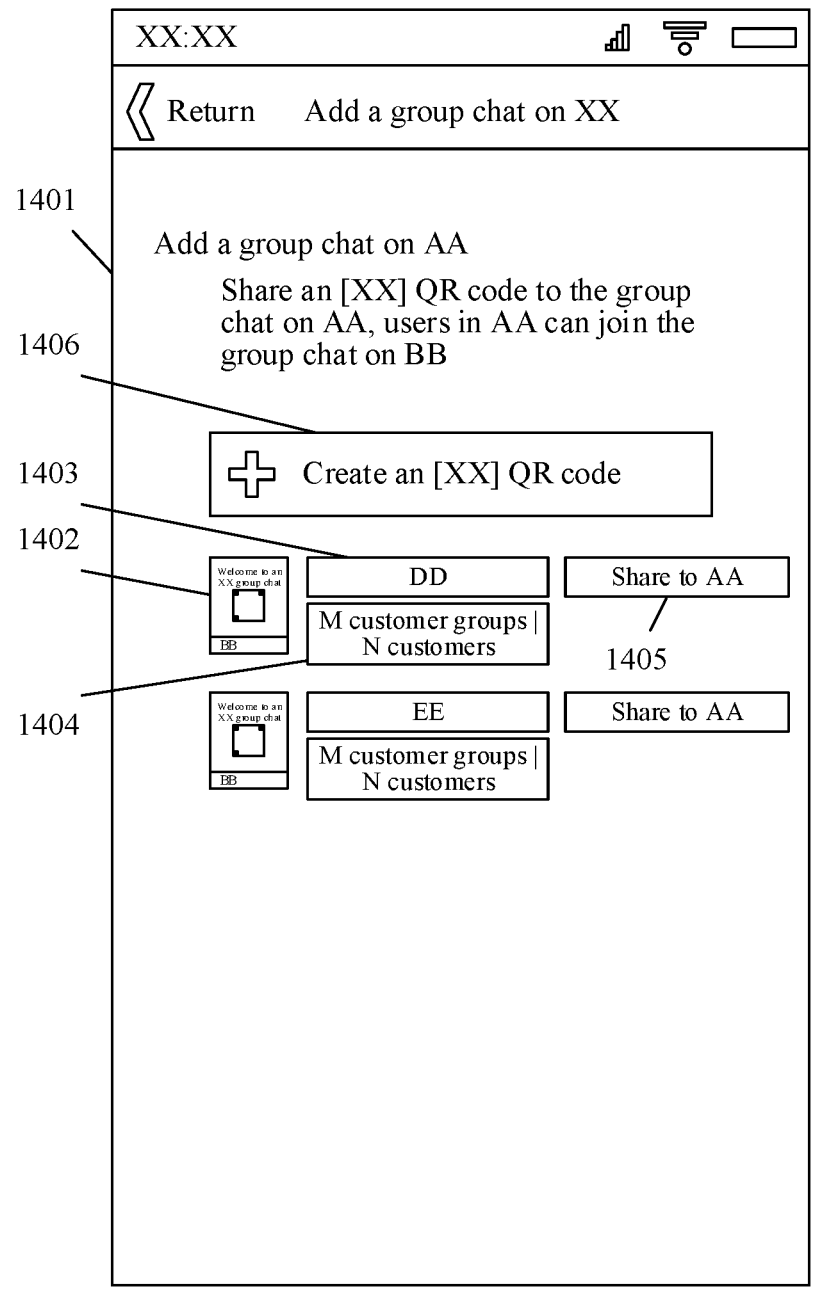
FIG. 14 is a schematic diagram of an interface according to certain embodiment(s) of the present disclosure.

For example, referring to FIG. 14, a terminal can display a group display interface 1401, and a graphic code 1402 created by the first account, a graphic code identifier 1403 corresponding to the graphic code 1402, the number of groups and the number of group users 1404 corresponding to the graphic code identifier 1403, and a group sharing control 1405 and a graphic code creation control 1406 corresponding to the graphic code identifier 1403 are displayed on the group display interface 1401. The terminal can perform the operations shown in step 303 above in response to a detected tapping operation on the graphic code sharing control 1405. The terminal can perform the operations shown in step 301 above in response to a detected tapping operation on the graphic code creation control 1406.

All the technical solutions may be arbitrarily combined to form an embodiment of the present disclosure, and details are not described herein again.

Through the technical solutions provided by the embodiments of the present disclosure, when an application program is replaced, it is doable to create a target graphic code on the first application, and share the target graphic code to a target group in the second application. Users in the target group can quickly join the group in the first application by the target graphic code, so that the efficiency of group user migration is higher. In addition, since the target group has a binding relationship with the target graphic code, it means that only users in the target group can join the first group based on the target graphic code, and users in other groups in the second application cannot join the first group based on the target graphic code. As a result, one group having one code is achieved, and the security of the target graphic code is higher.

Figure 15:
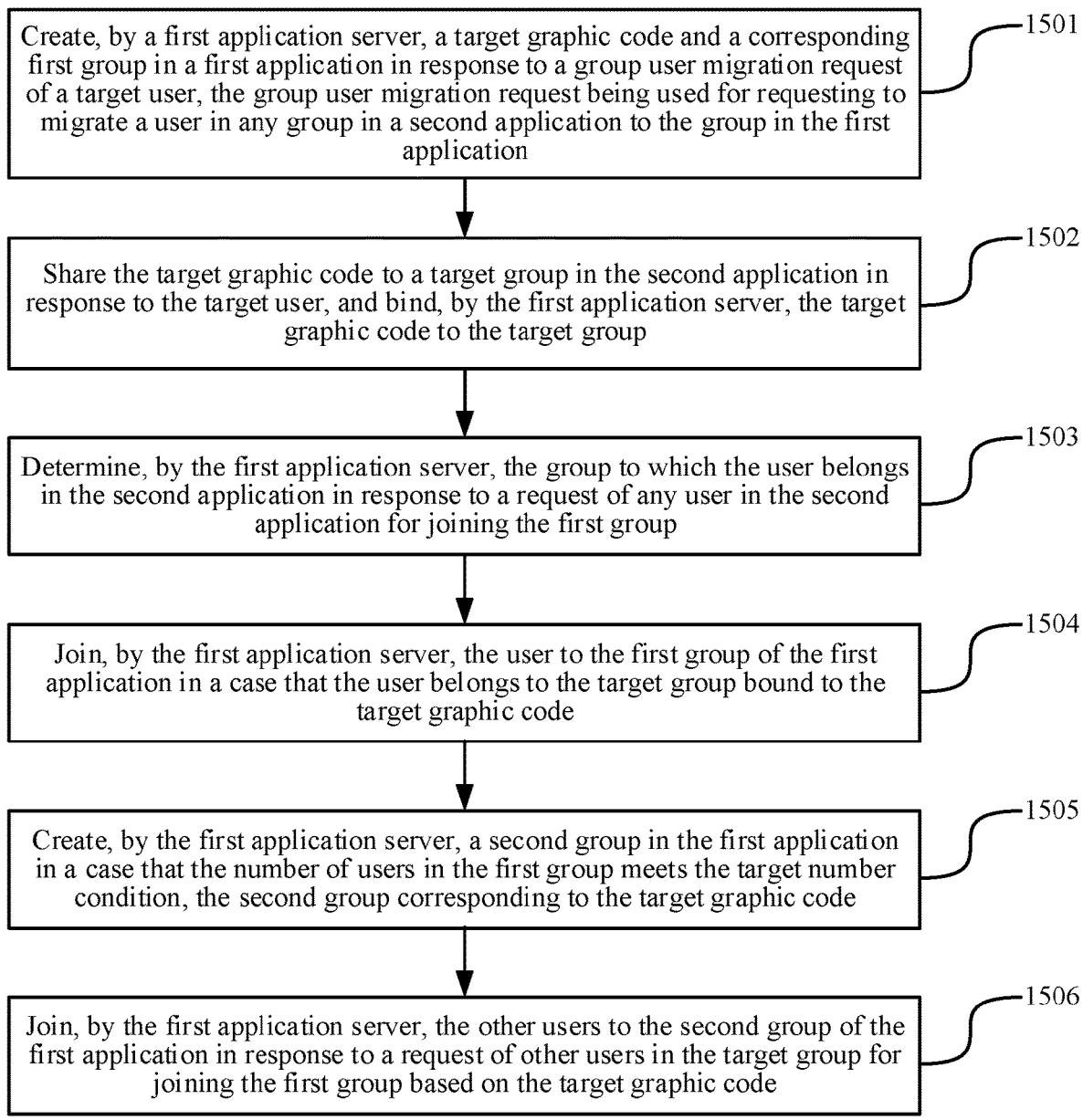
FIG. 15 is a flowchart of a group user migration method according to certain embodiment(s) of the present disclosure.

The above steps 301-307 are described based on a terminal as an execution subject. The processes of the technical solutions provided by the embodiments of the present disclosure, executed by a first application server as an execution subject, are described below. The first application server is configured to provide background services for a first application. Referring to FIG. 15, the method includes:

1501: Create, by the first application server, a target graphic code and a corresponding first group in the first application in response to a group user migration request, the group user migration request being used for requesting to migrate a user in any group in a second application to a group in the first application.

The second application and the first application are applications capable of performing user data intercommunication, and an account registered in the second application can be used for logging on to the first application. A target user is a user who uses the first application.

In an embodiment, a terminal can send a group user migration request to the first application server in response to a creation instruction triggered based on a graphic code creation interface. The first application server can create a target graphic code and a first group corresponding to the target graphic code in response to the received group user migration request, and the first group is a group in the first application.

For example, referring to FIG. 8, the terminal sends the group user migration request to the first application server in response to the creation instruction triggered based on the graphic code creation interface 801, that is, the creation instruction triggered by a user tapping the graphic code creation control 803. If the user inputs an identifier of the target graphic code on the graphic code creation interface 801, the group user migration request carries the identifier of the target graphic code. The first application server creates a target graphic code and a first group corresponding to the target graphic code in response to the received group user migration request. If the group migration request carries the identifier of the target graphic code, the first application server can obtain the identifier of the target graphic code from the group user migration request, and generate a group identifier of the first group based on the identifier of the target graphic code.

1502: Share the target graphic code to a target group in the second application in response to a sharing request for the target graphic code, and bind, by the first application server, the target graphic code to the target group.

In an embodiment, a terminal sends a sharing request for a target graphic code to the first application server in response to a sharing instruction for the target graphic code. The first application server shares the target graphic code to the target group in the second application in response to the received sharing request for the target graphic code, and simultaneously binds the target graphic code to the target group.

For example, referring to FIG. 13, the terminal sends a sharing request for the target graphic code to the first application server in response to a detected tapping operation on the sharing confirmation control 1304, and the sharing request for the target graphic code carries a group identifier of the target group. The first application server shares the target graphic code to the target group in the second application in response to the received sharing request for the target graphic code, obtains the group identifier of the target group from the sharing request for the target graphic code, and binds the target graphic code to the group identifier of the target group.

By this implementation, during the subsequent process of adding users to the first group by the first application server, the first application server will only add users in the target group to the first group, to improve the security of the target graphic code.

1503: Determine, by the first application server, the group to which the user belongs in the second application in response to a request of any user in the second application for joining the first group.

In an embodiment, a request for joining the first group is triggered by the user based on a target graphic code.

In an embodiment, a request for joining the first group carries a group identifier of the group to which the user belongs in the second application, the first application server can obtain the group identifier of the group to which the user belongs in the second application from the request for joining the first group, and the group identifier can indicate the group in the second application.

1504: Join, by the first application server, the user to the first group of the first application when or in response to determining that the user belongs to the target group bound to the target graphic code.

In an embodiment, the first application server joins a user to the first group of the first application when or in response to determining that a group identifier of the group to which the user belongs in the second application is the same as a group identifier of a target group.

In an embodiment, after step 1503, in addition to performing step 1504, the first application server can further perform the following steps.

In an embodiment, the request of a user for joining the first group is rejected when or in response to determining that the user does not belong to a target group bound to a target graphic code.

By this implementation, only users in the target group can join the first group, and users who are not in the target group cannot join the first group. As a result, "one group having one code" is achieved, and the security of the target graphic code is improved.

The above implementation will be described below by two examples.

Example 1: The first application server obtains the group identifier of the group to which the user joins in the second application in response to the request of the user for joining the second group based on the target graphic code. If the group identifier of the group to which the user joins does not include the group identifier of the target group, the first application server rejects the request of the user for joining the first group, and thus, the user cannot join the first group.

Example 2: The request for joining the first group carries the group identifier of the group to which the user belongs in the second application, and the first application server can obtain the group identifier of the group to which the user belongs in the second application from the request for joining the first group. If the group identifier of the group to which the user belongs in the second application is different from the group identifier of the target group, the first application server rejects the request of the user for joining the first group, and thus, the user cannot join the first group.

1505: Create, by the first application server, a second group in the first application when or in response to determining that the number of users in the first group meets a target number condition, the second group corresponding to the target graphic code.

1506: Join, by the first application server, the other users to the second group of the first application in response to a request of other users in the target group for joining the first group based on the target graphic code.

Through step 1505 and step 1506, when users in the first group are full, the first application server can automatically create a second group corresponding to the target graphic code, and users in the target group can directly join the second group based on the target graphic code without requiring the users to manually create a group, thereby saving labor and operation costs.

In certain embodiment(s), in the above description process, only steps 1501-1505 are used as examples for description. After step 1505, the first application server can further continue to create a third group corresponding to the target graphic code in response to the scenario that the number of users in the second group meets a target number condition, and so on. The embodiments of the present disclosure do not limit the number of groups corresponding to the target graphic code.

Figure 16:
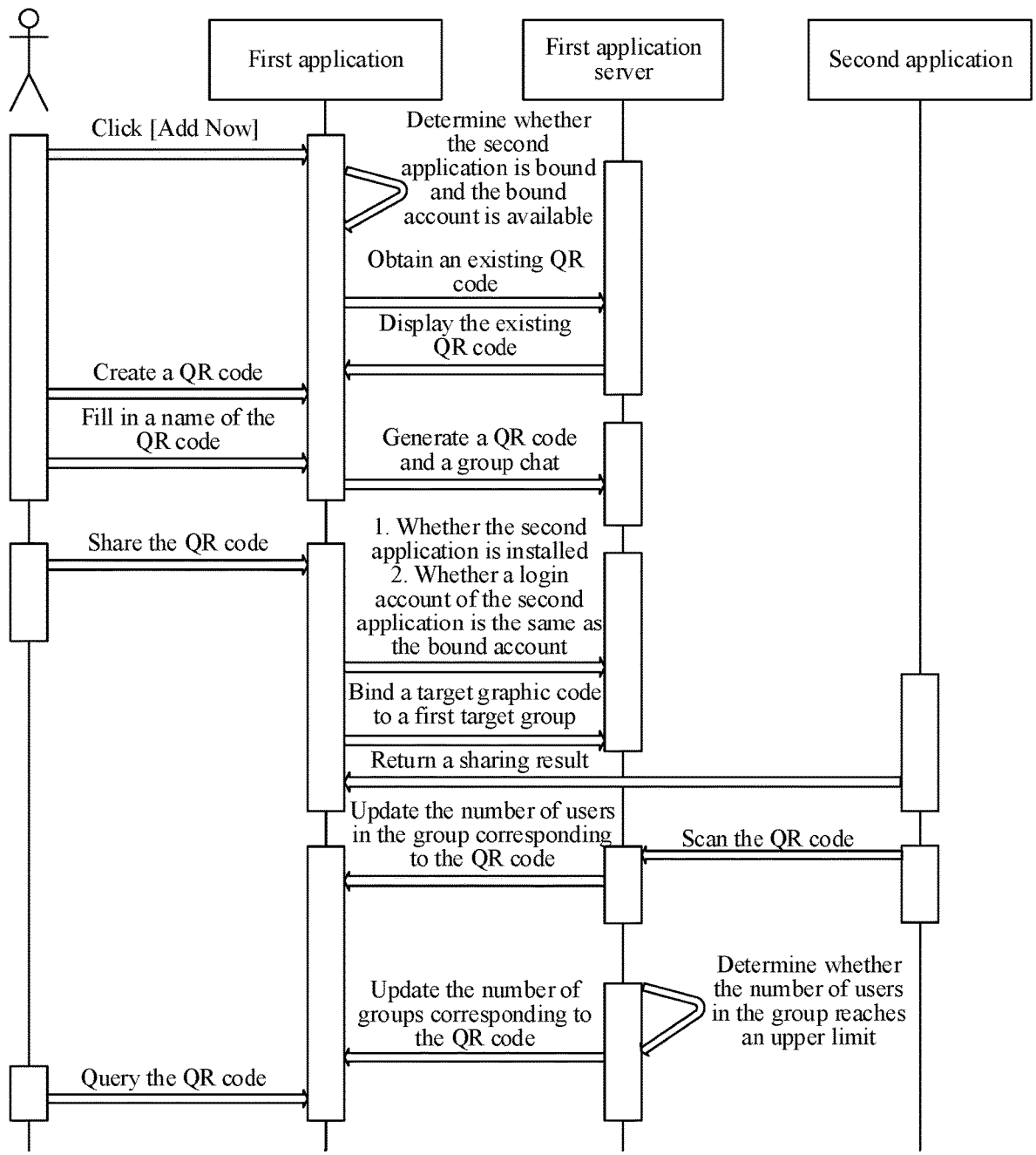
FIG. 16 is a schematic logical block diagram of a group user migration method according to certain embodiment(s) of the present disclosure.

The technical solutions provided by the present disclosure will be further described below with reference to FIG. 16, the above steps 301-307, the above steps 1501-1506, and the drawings in the above embodiments.

In the process described below, a graphic code is used as a two-dimensional code, and a user operates on the first application. Referring to FIG. 4, the group chat adding interface 401 of the first application is displayed on the terminal, and the group chat adding control 402 is displayed on the group chat adding interface 401. The user can migrate a user in any group in the second application to the first application by tapping the group chat adding control 402. The terminal can trigger a group user migration instruction in response to a detected tapping operation on the group chat adding control 402. The terminal determines whether the first account logged on to the first application is bound to any target account in response to the group user migration instruction. When or in response to determining that the first account is bound to a target account and the target account is not in a banned state, referring to FIG. 5, the terminal switches the group chat adding interface 401 of the first application to the first group user migration interface 501, and the function introduction 502 of the interface and the group user migration control 503 are displayed on the first group user migration interface 501. In response to a detected tapping operation on the group user migration control 503, referring to FIG. 5, the terminal switches the first group user migration interface 501 to the graphic code creation interface 801 of the first application, and the graphic code identifier input box 802 and the graphic code creation control 803 are displayed on the graphic code creation interface 801. The terminal sends a group user migration request to the first application server in response to a detected tapping operation on the graphic code creation control 803, and the group user migration request carries the characters inputted in the graphic code identifier input box 802. In response to the first application server receiving the group user migration request, a target graphic code and a first group corresponding to the target graphic code can be generated based on the characters inputted in the graphic code identifier input box 802, and the target graphic code is sent to the terminal. The terminal receives the target graphic code sent by the first application server, and the target graphic code 1002 is displayed on the graphic code display interface 1001 of the first application. The graphic code sharing control 1004 is further displayed on the graphic code display interface 1001, and the terminal determines whether the second application is installed in response to a detected tapping operation on the graphic code sharing control 1004. If the second application is installed, the terminal determines whether the second account logged on to the second application has a binding relationship with the first account logged on to the first application. In the scenario that the first account has a binding relationship with the second account, the application can select a group in the second application by the terminal. Referring to FIG. 13, the terminal can send a sharing request for the target graphic code to the first application server in response to a detected tapping operation on the sharing confirmation control 1304, and the sharing request for the target graphic code carries a group identifier of the target group. The first application server shares the target graphic code to the target group in response to the received sharing request for the target graphic code. Furthermore, the first application server obtains the group identifier of the target group from the sharing request for the target graphic code, and binds the group identifier of the target group to the target graphic code. Users in the target group in the second application can join the first group of the first application by identifying the target graphic code, and the first application server can update the number of users in the first group. When users in other groups in the second application want to join the first group by the target graphic code, the first application server will reject the request of the other users for joining the first group, that is, users in other groups cannot join the first group by the target graphic code. When determining that the number of users in the first group reaches an upper limit, the first application server can create a second group corresponding to the target graphic code and send related information of the second group to the first application, and the terminal can display the related information of the second group to the user by the first application. When the user wants to query the group information corresponding to the target graphic code, the user browses the graphic code display interface 1001 of the first application.

The above description describes the process of creating a new graphic code for the user. The method for viewing the existing graphic code by the user refers to the related description of FIG. 14 in step 307, and details are not repeated here.

Through the technical solutions provided by the embodiments of the present disclosure, when an application program is replaced, it is doable to create a target graphic code on the first application, and share the target graphic code to a target group in the second application. Users in the target group can quickly join the group in the first application by the target graphic code, so that the efficiency of group user migration is higher. In addition, since the target group has a binding relationship with the target graphic code, it means that only users in the target group can join the first group based on the target graphic code, and users in other groups in the second application cannot join the first group based on the target graphic code. As a result, one group having one code is achieved, and the security of the target graphic code is higher.

Although the steps in the flowcharts of the embodiments are displayed sequentially, these steps are not necessarily performed sequentially. Unless otherwise explicitly specified in the present disclosure, execution of the steps is not strictly limited, and the steps may be performed in other sequences. In addition, at least a part of the steps in the embodiments may include a plurality of substeps or a plurality of stages. These substeps or stages are not necessarily performed at the same moment, and may be performed at different moments. Besides, the substeps or stages may not be necessarily performed sequentially, and may be performed in turn or alternately with other steps or at least a part of substeps or stages of other steps.

Figure 17:
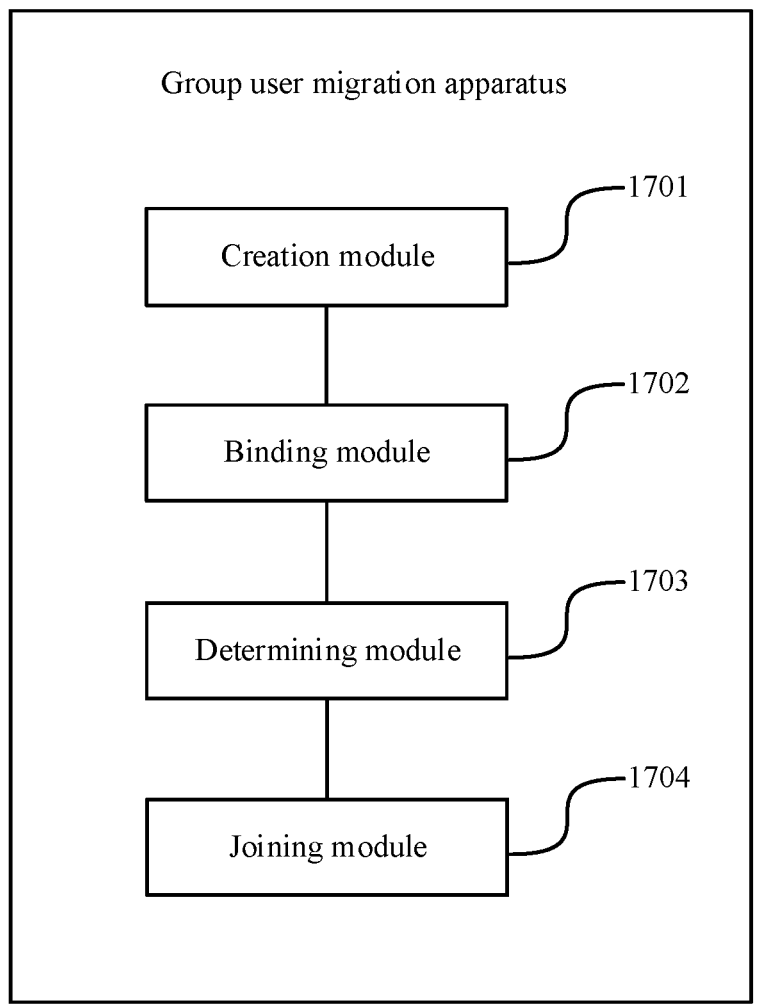
FIG. 17 is a schematic structural diagram of a group user migration apparatus according to certain embodiment(s) of the present disclosure.

FIG. 17 is a schematic structural diagram of a group user migration apparatus provided by an embodiment of the present disclosure. The apparatus is applicable to a first application server, and the first application server is configured to provide background services for a first application. Referring to FIG. 17, the apparatus includes a creation module 1701, a binding module 1702, a determining module 1703 and a joining module 1704.

The creation module 1701 is configured to create a target graphic code and a corresponding first group in the first application in response to a group user migration request, and the group user migration request is used for requesting to migrate a user in any group in a second application to a group in the first application.

The binding module 1702 is configured to share the target graphic code to a target group in the second application in response to a sharing request for the target graphic code, and bind the target graphic code to the target group.

The determining module 1703 is configured to determine the group to which the user belongs in the second application in response to a request of any user in the second application for joining the first group.

The joining module 1704 is configured to join the user to the first group of the first application when or in response to determining that the user belongs to the target group bound to the target graphic code.

In an embodiment, the joining module is further configured to join the user to the first group of the first application when or in response to determining that a group identifier of the group to which the user belongs in the second application is the same as a group identifier of the target group.

In an embodiment, the joining module is further configured to reject the request of the user for joining the first group when or in response to determining that the user does not belong to the target group bound to the target graphic code.

In an embodiment, the joining module is further configured to reject the request of the user for joining the first group when or in response to determining that a group identifier of the group to which the user belongs in the second application is different from a group identifier of the target group.

In an embodiment, the creation module is further configured to create a second group in the first application when or in response to determining that the number of users in the first group meets a target number condition, and the second group corresponds to the target graphic code.

In an embodiment, the joining module is further configured to join the other users to the second group of the first application in response to a request of other users in the target group for joining the first group.

When the group user migration apparatus provided in the embodiments migrates group users, it is illustrated with an example of division of each functional module. In practical application, the function distribution may be implemented by different functional modules according to desirables, that is, an internal structure of the computing device is divided into different functional modules, to implement all or some of the functions described above. In addition, the group user migration apparatus provided in the embodiments and the group user migration method embodiments belong to one conception. For a specific implementation process, refer to the method embodiments.

Through the technical solutions provided by the embodiments of the present disclosure, when an application program is replaced, it is doable to create a target graphic code on the first application, and share the target graphic code to a target group in the second application. Users in the target group can quickly join the group in the first application by the target graphic code, so that the efficiency of group user migration is higher. In addition, since the target group has a binding relationship with the target graphic code, it means that only users in the target group can join the first group based on the target graphic code, and users in other groups in the second application cannot join the first group based on the target graphic code. As a result, one group having one code is achieved, and the security of the target graphic code is higher.

Figure 18:
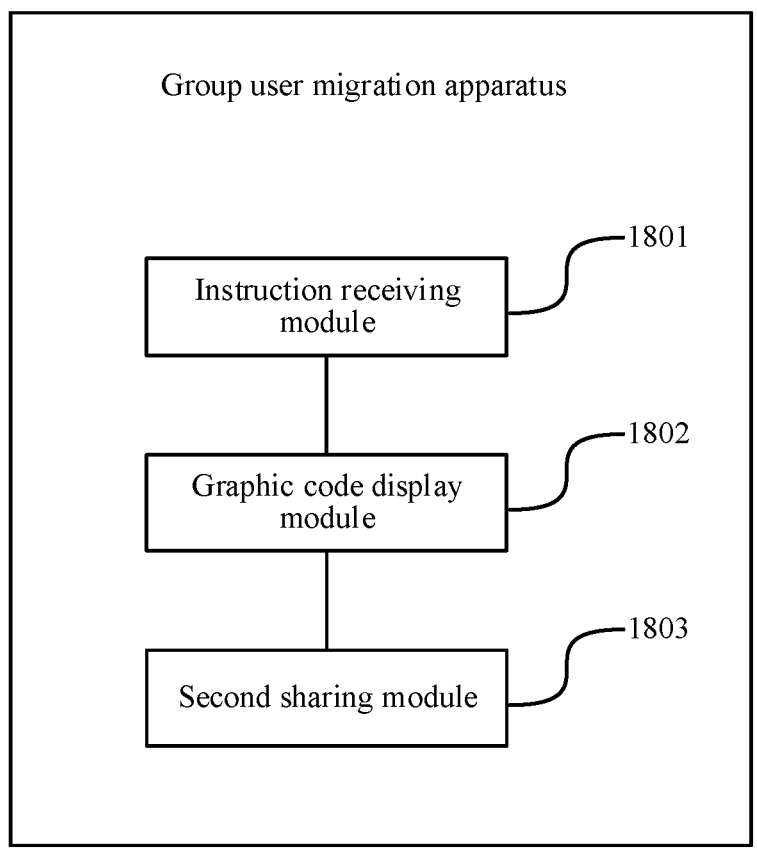
FIG. 18 is a schematic structural diagram of a group user migration apparatus according to certain embodiment(s) of the present disclosure.

FIG. 18 is a schematic structural diagram of a group user migration apparatus provided by an embodiment of the present disclosure. Referring to FIG. 18, the apparatus includes an instruction receiving module 1801, a graphic code display module 1802 and a second sharing module 1803.

The instruction receiving module 1801 is configured to receive a group user migration instruction, and the group user migration instruction is used for instructing to migrate a user in any group in the second application to a group in the first application.

The graphic code display module 1802 is configured to display a target graphic code in response to the group user migration instruction, and the target graphic code corresponds to a first group created in the first application.

The second sharing module 1803 is configured to share the target graphic code to a target group in the second application in response to a sharing instruction for the target graphic code, to join users in the target group to the first group of the first application based on the target graphic code, and the target group has a binding relationship with the target graphic code.

In an embodiment, the graphic code display module is configured to display a graphic code creation interface in response to the group user migration instruction; and display a graphic code display interface in response to a creation instruction triggered based on the graphic code creation interface. A target graphic code is displayed on the graphic code display interface.

In an embodiment, the number of users in the first group is further displayed on the graphic code display interface, and the graphic code display module is further configured to update the number of users in the first group on the graphic code display interface when or in response to determining that any user in the target group joins the first group.

In an embodiment, a group identifier of the first group is further displayed on the graphic code display interface, and the graphic code display module is further configured to display a group session interface of the first group in response to a detected triggering operation on the group identifier of the first group.

In an embodiment, the graphic code display module is further configured to display a group identifier of the second group on the graphic code display interface when or in response to determining that the number of users in the first group meets a target number condition, the second group is a group created in the first application, and the second group corresponds to the target graphic code.

In an embodiment, the second sharing module is configured to display a group sharing interface in response to the sharing instruction for the target graphic code, the group sharing interface including at least one group in the second application; and share the target graphic code to a target group in the second application in response to a triggering operation on the target group in the group sharing interface.

In an embodiment, a first account is logged on to the first application. The apparatus further includes any one of the following modules: a first prompt module configured to display an account unbinding prompt when or in response to determining that the first account is not bound to any target account; and a second prompt module configured to display an account banning prompt when or in response to determining that the first account is bound to any target account, and any target account is in a banned state, where the target account is an account registered in a second application.

In an embodiment, a first account is logged on to the first application, and a second account is logged on to the second application. The apparatus further includes: a third prompt module configured to display an account switching prompt when or in response to determining that the second account is different from a third account. The account switching prompt is used for prompting to use the third account to log on to the second application. The third account is an account registered in the second application and bound to the first account.

In an embodiment, a first account is logged on to the first application. The apparatus further includes: a group display interface display module configured to display a group display interface when or in response to determining that any graphic code is created by the first account. Any graphic code and the number of groups corresponding to any graphic code are displayed on the group display interface.

When the group user migration apparatus provided in the embodiments migrates group users, it is illustrated with an example of division of each functional module. In an implementation, the function distribution may be implemented by different functional modules according to desirables, that is, an internal structure of the computing device is divided into different functional modules, to implement all or some of the functions described above. In addition, the group user migration apparatus provided in the embodiments and the group user migration method embodiments belong to one conception. For a specific implementation process, refer to the method embodiments.

Through the technical solutions provided by the embodiments of the present disclosure, when an application program is replaced, it is doable to create a target graphic code on the first application, and share the target graphic code to a target group in the second application. Users in the target group can quickly join the group in the first application by the target graphic code, so that the efficiency of group user migration is higher. In addition, since the target group has a binding relationship with the target graphic code, it means that only users in the target group can join the first group based on the target graphic code, and users in other groups in the second application cannot join the first group based on the target graphic code. As a result, one group having one code is achieved, and the security of the target graphic code is higher.

Figure 19:
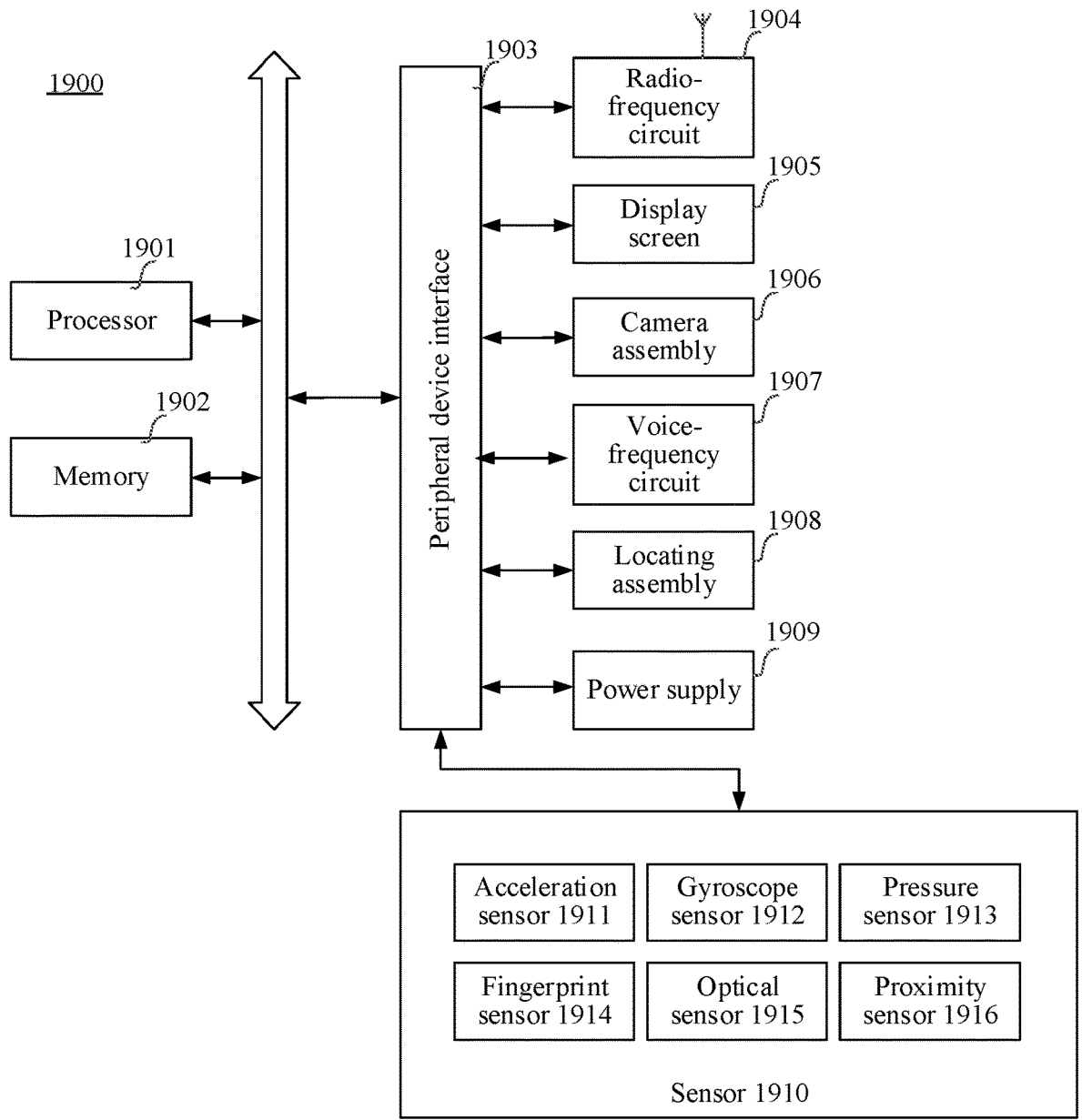
FIG. 19 is a schematic structural diagram of a terminal according to certain embodiment(s) of the present disclosure.

An embodiment of the present disclosure provides a computing device, configured to perform the method, the computing device may be implemented as a terminal or a first application server, and a structure of the terminal is first described below:

FIG. 19 is a schematic structural diagram of a terminal provided by an embodiment of the present disclosure. The terminal 1900 may be a smartphone, a tablet computer, a notebook computer or a desktop computer. The terminal 1900 may also be referred to by other names as user equipment, a portable terminal, a laptop terminal, a desktop terminal, etc.

Generally, the terminal 1900 includes one or more processors 1901 and one or more memories 1902.

The processor 1901 may include one or more processing cores, such as a 4-core processor or an 8-core processor. The processor 1901 may be implemented by at least one hardware form in a digital signal processing (DSP), a field-programmable gate array (FPGA), and a programmable logic array (PLA). The processor 1901 may also include a main processor and a co-processor. The main processor is a processor for processing data in a wake-up state, also referred to as a central processing unit (CPU). The coprocessor is a low power consumption processor configured to process data in a standby state. In some embodiments, the processor 1901 may be integrated with a graphics processing unit (GPU) that is responsible for rendering and drawing content to be displayed by a display screen. In some embodiments, the processor 1901 may further include an artificial intelligence (AI) processor. The AI processor is configured to process a computing operation related to machine learning.

The memory 1902 may include one or more computer-readable storage media. The computer-readable storage media may be non-transitory. The memory 1902 may also include a high-speed random access memory, as well as non-volatile memory, such as one or more disk storage devices and flash storage devices. In some embodiments, the non-transient computer-readable storage medium in the memory 1902 is configured to store at least one computer-readable instruction, and the at least one computer-readable instruction is configured to be executed by the processor 1901 to implement the group user migration method provided in the method embodiments of the present disclosure.

In some embodiments, the terminal 1900 may include a peripheral device interface 1903 and at least one peripheral device. The processor 1901, the memory 1902, and the peripheral device interface 1903 may be connected by using a bus or a signal cable. Each peripheral device may be connected to the peripheral device interface 1903 by using a bus, a signal line, or a circuit board. In certain embodiment(s), the peripherals include: at least one of a radio frequency (RF) circuit 1904, a display screen 1905, a camera assembly 1906, an audio circuit 1907, a positioning assembly 1908, and a power supply 1909.

The peripheral device interface 1903 may be configured to connect at least one peripheral device related to input/output (I/O) to the processor 1901 and the memory 1902. In some embodiments, the processor 1901, the memory 1902, and the peripheral device interface 1903 are integrated on the same chip or the same circuit board. In some other embodiments, any or both of the processor 1901, the memory 1902, and the peripheral device interface 1903 may be implemented on an independent chip or circuit board, which is not limited in this embodiment.

The radio frequency circuit 1904 is configured to receive and transmit a radio frequency (RF) signal, which is also referred to as an electromagnetic signal. The RF circuit 1904 communicates with a communication network and another communication device by using the electromagnetic signal. The RF circuit 1904 converts an electric signal into an electromagnetic signal for transmission, or converts a received electromagnetic signal into an electric signal. In an embodiment, the RF circuit 1904 includes an antenna system, an RF transceiver, one or more amplifiers, a tuner, an oscillator, a digital signal processor, a code chip set, a subscriber identity module card, and the like.

The display screen 1905 is configured to display a user interface (UI). The UI may include a graph, a text, an icon, a video, and any combination thereof. When the display screen 1905 is a touch display screen, the display screen 1905 also has the ability to collect a touch signal at or above the surface of the display screen 1905. The touch signal may be inputted, as a control signal, to the processor 1901 for processing. In this scenario, the display screen 1905 may also be configured to provide virtual buttons and/or virtual keyboards, also referred to as soft buttons and/or soft keyboards.

The camera assembly 1906 is configured to capture images or videos. In an embodiment, the camera assembly 1906 includes a front camera and a rear camera. Generally, the front-facing camera is arranged on a front panel of the terminal, and the rear-facing camera is arranged on a rear surface of the terminal.

The audio frequency circuit 1907 may include a microphone and a speaker. The microphone is configured to collect sound waves from a user and an environment and convert the sound waves into electrical signals that are inputted to the processor 1901 for processing or to the radio frequency circuit 1904 for voice communication.

The positioning component 1908 is configured to position a current geographic location of the terminal 1900 to implement navigation or location based service (LBS).

The power supply 1909 is configured to supply power to components in the terminal 1900. The power supply 1909 may be an alternating current, a direct current, a disposable battery, or a rechargeable battery.

In some embodiments, the terminal 1900 also includes one or more sensors 1910. The one or more sensors 1910 include, but are not limited to: an acceleration sensor 1911, a gyroscope sensor 1912, a pressure sensor 1913, a fingerprint sensor 1914, an optical sensor 1915, and a proximity sensor 1916.

The acceleration sensor 1911 may detect the magnitude of acceleration on three coordinate axes of a coordinate system established with the terminal 1900.

The gyroscope sensor 1912 may detect a body direction and a rotation angle of the terminal 1900, and the gyroscope sensor 1912 may collect a 3D motion of the terminal 1900 by a user in cooperation with the acceleration sensor 1911.

The pressure sensor 1913 may be arranged on a side frame of the terminal 1900 and/or a lower layer of the display screen 1905. When the pressure sensor 1913 is arranged on the side frame of the terminal 1900, a grip signal of the user to the terminal 1900 may be detected, and the processor 1901 performs left and right hand recognition or a quick operation according to the grip signal collected by the pressure sensor 1913. When the pressure sensor 1913 is arranged on the lower layer of the display screen 1905, the processor 1901 controls an operable control on the UI interface according to a pressure operation of the user on the display screen 1905.

The fingerprint sensor 1914 is configured to collect a fingerprint of the user, and an identity of the user is recognized by the processor 1901 according to the fingerprint collected by the fingerprint sensor 1914, or the identity of the user is recognized by the fingerprint sensor 1914 according to the collected fingerprint.

The optical sensor 1915 is configured to collect ambient light intensity. In one embodiment, the processor 1901 may control the display brightness of the display screen 1905 according to the ambient light intensity collected by the optical sensor 1915.

The proximity sensor 1916 is configured to collect a distance between the user and a front surface of the terminal 1900.

A person skilled in the art can understand that the structure shown in FIG. 19 does not constitute a limitation to the terminal 1900, and the terminal may include more or fewer components than those shown in the figure, or some components may be combined, or a different component arrangement may be used.

Figure 20:
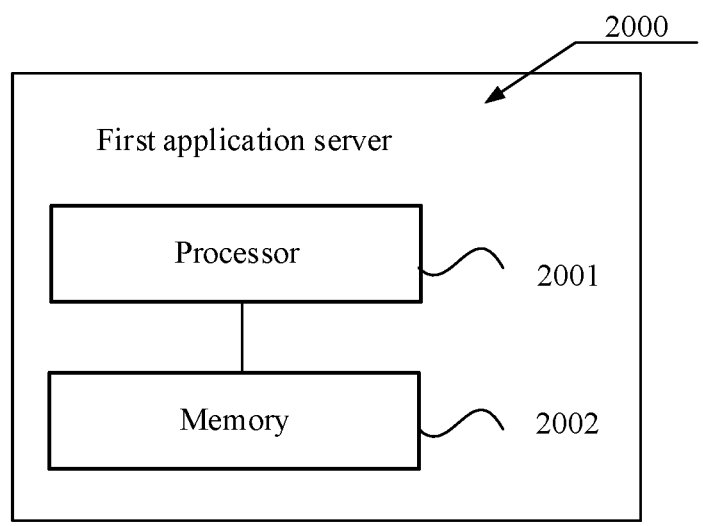
FIG. 20 is a schematic structural diagram of a first application server according to certain embodiment(s) of the present disclosure.

The above computing device may further be implemented as a first application server, and the structure of the first application server is introduced below:

FIG. 20 is a schematic structural diagram of a first application server provided by an embodiment of the present disclosure. The first application server 2000 may vary greatly due to different configurations or performances, and may include one or more processors (such as central processing units (CPUs)) 2001 and one or more memories 2002. The one or more memories 2002 store at least one computer-readable instruction, the at least one computer-readable instruction being loaded and executed by the one or more processors 2001 to implement the methods provided in the method embodiments. In certain embodiment(s), the first application server 2000 further includes components such as a wired or wireless network interface, a keyboard, and an input/output (I/O) interface, to facilitate input and output. The first application server 2000 further includes another component configured to implement a function of a device. Details are not further described herein.

In an exemplary embodiment, one or more computer-readable storage media are also provided, for example, including a memory including a computer-readable instruction. The computer-readable instruction may be executed by a processor to implement the group user migration method in the embodiments. For example, the computer-readable storage medium may be a read-only memory (ROM), a random access memory (random-access memory, RAM), a compact disc read-only memory (CD-ROM), a magnetic tape, a floppy disk, an optical data storage device, and the like.

In an exemplary embodiment, a computer program product is also provided, including program code, the program code being stored in a computer-readable storage medium, a processor of a computing device reading the program code from the computer-readable storage medium, and the processor executing the program code, to cause the computing device to implement the group user migration method.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person of ordinary skill in the art may understand that all or some of the steps of the embodiments may be implemented by hardware, or may be implemented a program instructing related hardware. The program may be stored in a computer-readable storage medium. The storage medium may be: a ROM, a magnetic disk, or an optical disc.

The descriptions are merely embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A group user migration method applied to a first application server, the first application server being configured to provide background services for a first application, and the method comprising:
    creating a target graphic code and a first group in the first application in response to a group user migration request, the group user migration request being used for requesting to migrate a user in a group in a second application to a group in the first application;
    in response to a sharing request for the target graphic code: establishing, on the first application server, a binding relationship between the target graphic code of the first group and a target group in the second application; and sharing the target graphic code to the target group in the second application;
    determining a group to which a user belongs in the second application in response to a request of the user in the second application for joining the first group;
    joining a first user to the first group of the first application in response to determining that the first user belongs to the target group according to the binding relationship between the target graphic code of the first group and the target group; and
    rejecting a request of a second user for joining the first group in response to determining that one or more group identifiers of one or more groups to which the second user joins in the second application do not include a group identifier of the target group or that the group identifier of the group to which the second user belongs in the second application is different from the group identifier of the target group.

2. The method according to claim 1, wherein joining the first user comprises:
    joining the first user to the first group of the first application in response to determining that a group identifier of the group to which the first user belongs in the second application is the same as a group identifier of the target group.

3. The method according to claim 1, further comprising:
    creating a second group in the first application in response to determining that the number of users in the first group meets a target number condition, the second group corresponding to the target graphic code.

4. The method according to claim 3, further comprising:
joining the other users to the second group of the first application in response to a request of other users in the target group for joining the first group.

5. A group user migration method applied to a terminal, a first application and a second application being installed on the terminal, and the method comprising:
receiving a group user migration instruction, the group user migration instruction being used for instructing to migrate a user in a group in the second application to a group in the first application;
displaying a graphic code creation interface in response to the group user migration instruction;
displaying a graphic code display interface in response to a creation instruction triggered based on the graphic code creation interface, a target graphic code corresponding to a first group created in the first application being displayed on the graphic code display interface;
sharing the target graphic code to a target group in the second application in response to a sharing instruction for the target graphic code, to join users in the target group to the first group of the first application based on the target graphic code; and
displaying a group identifier of the second group on the graphic code display interface in response to determining that a number of users in the first group meets a target number condition, the second group being a group created in the first application, and the second group corresponding to the target graphic code.

6. The method according to claim 5, wherein the number of users in the first group is further displayed on the graphic code display interface, and the method further comprises:
updating the number of users in the first group on the graphic code display interface in response to determining that a user in the target group joins the first group.

7. The method according to claim 5, wherein a group identifier of the first group is further displayed on the graphic code display interface, and the method further comprises:
displaying a group session interface of the first group in response to a triggering operation on the group identifier of the first group.

8. The method according to claim 5, wherein the target group is in a binding relationship with the target graphic code.

9. A group user migration apparatus applied to a first application server, the first application server being configured to provide background services for a first application, and the apparatus comprising: at least one memory storing computer program instructions; and at least one processor coupled to the at least one memory and configured to execute the computer program instructions and perform:
creating a target graphic code and a first group in the first application in response to a group user migration request, the group user migration request being used for requesting to migrate a user in a group in a second application to a group in the first application;
in response to a sharing request for the target graphic code: establishing, on the first application server, a binding relationship between the target graphic code of the first group and a target group in the second application; and sharing the target graphic code to the target group in the second application;
determining a group to which a user belongs in the second application in response to a request of the user in the second application for joining the first group;
joining a first user to the first group of the first application in response to determining that the first user belongs to the target group according to the binding relationship between the target graphic code of the first group and the target group; and
rejecting a request of a second user for joining the first group in response to determining that one or more group identifiers of one or more groups to which the second user joins in the second application do not include a group identifier of the target group or that the group identifier of the group to which the second user belongs in the second application is different from the group identifier of the target group.

10. The group user migration apparatus according to claim 9, wherein joining the first user comprises:
joining the first user to the first group of the first application in response to determining that a group identifier of the group to which the first user belongs in the second application is the same as a group identifier of the target group.

11. The group user migration apparatus according to claim 9, wherein the at least one processor is further configured to execute the computer program instructions and perform:
creating a second group in the first application in response to determining that the number of users in the first group meets a target number condition, the second group corresponding to the target graphic code.

12. The group user migration apparatus according to claim 11, wherein the at least one processor is further configured to execute the computer program instructions and perform:
joining the other users to the second group of the first application in response to a request of other users in the target group for joining the first group.

* * * * *